US012431083B2

(12) United States Patent
Kuang et al.

(10) Patent No.: US 12,431,083 B2
(45) Date of Patent: Sep. 30, 2025

(54) DISPLAY PANEL, METHOD FOR DRIVING THE SAME, AND DISPLAY APPARATUS

(71) Applicant: Wuhan Tianma Microelectronics Co., Ltd. Shanghai Branch, Shanghai (CN)

(72) Inventors: Jian Kuang, Shanghai (CN); Mengmeng Zhang, Shanghai (CN); Xingyao Zhou, Shanghai (CN)

(73) Assignee: Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 4 days.

(21) Appl. No.: 18/455,443

(22) Filed: Aug. 24, 2023

(65) Prior Publication Data

US 2023/0402011 A1 Dec. 14, 2023

Related U.S. Application Data

(63) Continuation of application No. 17/859,991, filed on Jul. 7, 2022, now Pat. No. 11,769,452.

(30) Foreign Application Priority Data

Apr. 1, 2022 (CN) ......................... 202210348580.8

(51) Int. Cl.
*G09G 3/3233* (2016.01)
*G09G 3/20* (2006.01)

(52) U.S. Cl.
CPC ......... *G09G 3/3233* (2013.01); *G09G 3/2007* (2013.01); *G09G 2300/0426* (2013.01); (Continued)

(58) Field of Classification Search
None
See application file for complete search history.

(56) References Cited

U.S. PATENT DOCUMENTS

2018/0151123 A1* 5/2018 Li ......................... G09G 3/3233
2020/0175911 A1 6/2020 Ko et al.
(Continued)

FOREIGN PATENT DOCUMENTS

CN 112086062 A 12/2020
CN 112634832 A 4/2021

OTHER PUBLICATIONS

Chinese Office Action mailed Aug. 9, 2024, issued in related Chinese Application No. 202210348580.8 filed Apr. 1, 2022, 22 pages.

*Primary Examiner* — Matthew Yeung
(74) *Attorney, Agent, or Firm* — Christensen O'Connor Johnson Kindness PLLC

(57) ABSTRACT

A display panel, a method for driving the same, and a display apparatus are provided. The display panel includes data signal lines and pixel circuits. The pixel circuit includes a driving module and a data voltage writing module. The data voltage writing module is connected between the data signal line and the input terminal of the driving module. The display panel has first and second phases when displaying one frame of an image. The first phase includes a data writing phase and a light-emitting phase. The second phase includes an adjusting phase and a light-emitting phase. During the data writing phase, the data voltage writing module is turned on, and the data signal line transmits the data voltage. During the adjusting phase, the data voltage writing module is turned on, and the data signal line transmits the adjusting voltage corresponding to the data voltage transmitted during the data writing phase.

28 Claims, 21 Drawing Sheets

(52) U.S. Cl.
CPC . *G09G 2300/0842* (2013.01); *G09G 2310/08* (2013.01); *G09G 2320/0233* (2013.01); *G09G 2320/0247* (2013.01)

(56) References Cited

U.S. PATENT DOCUMENTS

| | | | | |
|---|---|---|---|---|
| 2021/0104196 | A1 | 4/2021 | Yuan | |
| 2021/0158755 | A1* | 5/2021 | Li | G09G 3/3266 |
| 2022/0005414 | A1 | 1/2022 | Liu et al. | |
| 2022/0051627 | A1* | 2/2022 | Yang | G09G 3/3233 |
| 2022/0351671 | A1 | 11/2022 | Xu et al. | |

* cited by examiner

DISPLAY PANEL, METHOD FOR DRIVING THE SAME, AND DISPLAY APPARATUS

CROSS-REFERENCE TO RELATED DISCLOSURE

The present application is a continuation of U.S. patent application Ser. No. 17/859,991, filed on Jul. 7, 2022, which claims priority to Chinese Patent Application No. 202210348580.8, filed on Apr. 1, 2022. All of the above-mentioned patent applications are hereby incorporated by reference in their entireties.

TECHNICAL FIELD

The present disclosure relates to the field of display technologies, and, particularly, relates to a display panel, a method for driving a display panel, and a display apparatus.

BACKGROUND

An organic light-emitting diode (OLED) display panel has been widely used in the market due to advantages such as low power consumption, self-luminescence, wide viewing angle, wide temperature characteristics, and fast response speed. The pixel driving circuit configured to control the light-emitting device to emit light is a core technical component of the OLED display panel, and has important research significance.

In pixel circuits of the related art, due to the operating characteristics of the driving transistors, the light-emitting brightness of the display panel during a first phase is quite different from the light-emitting brightness of the display panel during a second phase, which affects the display effect. The first phase refers to a phase including a data voltage writing phase and a light-emitting phase. The second phase is performed after the first phase and does not include the data voltage writing phase, but includes a light-emitting phase. In a low-gray-scale and low-frequency display state of the display panel, the difference between the brightness of the display panel during the first phase and the brightness of the display panel during the second phase is very obvious, which seriously affects the display effect of the display panel.

SUMMARY

A first aspect of the present disclosure provides a display panel. The display panel includes a plurality of data signal lines arranged along a first direction and electrically connected to a plurality of pixel circuits. Each of the plurality of pixel circuits includes a driving module configured to generate a light-emitting driving current, a data voltage writing module configured to transmit a signal transmitted by one of the plurality of data signal lines to an input terminal of the driving module, and a threshold voltage capturing module. When the display panel displays one of at least one frame of an image, the display panel includes a first phase and a second phase performed after the first phase. The first phase includes a data writing phase and a first light-emitting phase performed after the data writing phase, and the second phase includes at least one adjusting phase and a second light-emitting phase performed after the at least one adjusting phase. During the data writing phase, the data voltage writing module is turned on, and the one of the plurality of data signal lines is configured to transmit a data voltage to the driving module. During each of the at least one adjusting phase, the data voltage writing module is turned on, and the one of the plurality of data signal lines is configured to transmit an adjusting voltage to the driving module. When the display panel displays one frame of the at least one frame of the image, the adjusting voltage transmitted by the one of the plurality of data signal lines during the second phase corresponds to the data voltage transmitted by the one of the plurality of data signal lines during the first phase. The threshold voltage capturing module is turned off during the at least one adjusting phase.

A second aspect of the present disclosure provides a method for driving a display panel. The display panel includes a plurality of data signal lines arranged along a first direction and electrically connected to a plurality of pixel circuits. Each of the plurality of pixel circuits includes a driving module configured to generate a light-emitting driving current, a data voltage writing module configured to transmit a signal transmitted by one of the plurality of data signal lines to an input terminal of the driving module, and a threshold voltage capturing module. When the display panel displays one frame of at least one frame of an image, the display panel includes a first phase and a second phase performed after the first phase. The first phase includes a data writing phase and a first light-emitting phase performed after the data writing phase, and the second phase includes at least one adjusting phase and a second light-emitting phase performed after the at least one adjusting phase. The method includes: during the data writing phase, turning on the data voltage writing module, and transmitting, by the one of the plurality of data signal lines, a data voltage to the driving module; and during each of the at least one adjusting phase, turning on the data voltage writing module, and transmitting, by the one of the plurality of data signal lines, an adjusting voltage to the driving module. The adjusting voltage transmitted by the one of the plurality of data signal lines during the second phase corresponds to the data voltage transmitted by the one of the plurality of data signal lines during the first phase. The threshold voltage capturing module is turned off during the at least one adjusting phase.

A third aspect of the present disclosure provides a display apparatus. The display apparatus includes a display panel. The display panel includes a plurality of data signal lines arranged along a first direction and electrically connected to a plurality of pixel circuits. Each of the plurality of pixel circuits includes a driving module configured to generate a light-emitting driving current, a data voltage writing module configured to transmit a signal transmitted by one of the plurality of data signal lines to an input terminal of the driving module, and a threshold voltage capturing module. When the display panel displays one frame of at least one frame of an image, the display panel includes a first phase and a second phase performed after the first phase. The first phase includes a data writing phase and a first light-emitting phase performed after the data writing phase, and the second phase includes at least one adjusting phase and a second light-emitting phase performed after the at least one adjusting phase. During the data writing phase, the data voltage writing module is turned on, and the one of the plurality of data signal lines is configured to transmit a data voltage to the driving module. During each of the at least one adjusting phase, the data voltage writing module is turned on, and the one of the plurality of data signal lines is configured to transmit an adjusting voltage to the driving module. When the display panel displays one frame of the at least one frame of the image, the adjusting voltage transmitted by the one of the plurality of data signal lines during the second phase corresponds to the data voltage transmitted by the one of the plurality of data signal lines during the first phase. The threshold voltage capturing module is turned off during the at least one adjusting phase.

BRIEF DESCRIPTION OF DRAWINGS

In order to more clearly illustrate technical solutions of embodiments of the present disclosure, the accompanying drawings used in the embodiments are briefly described below. The drawings described below are merely some embodiments of the present disclosure. Based on these drawings, those skilled in the art can obtain other drawings.

DESCRIPTION OF EMBODIMENTS

Figure 1:
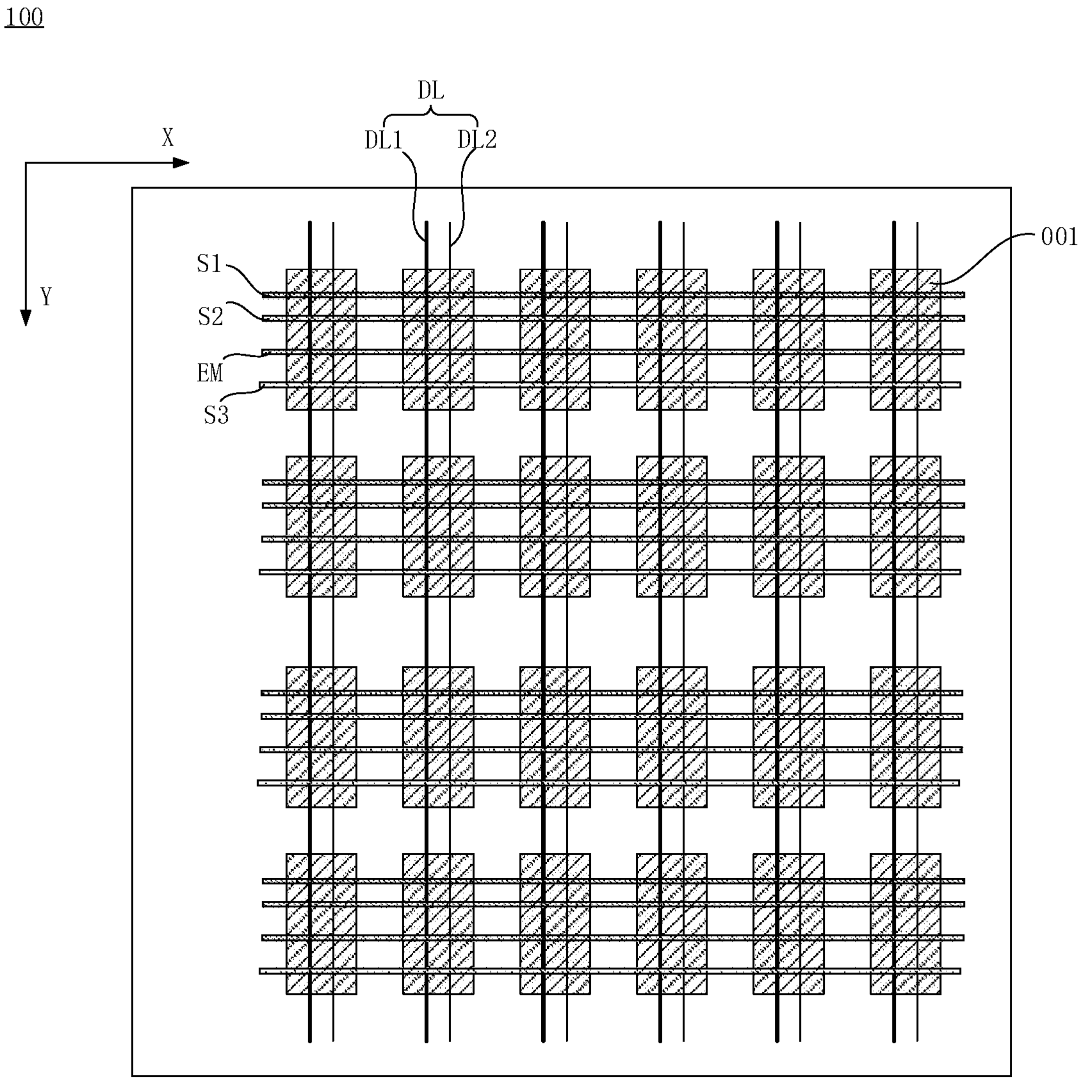
FIG. 1 is a schematic diagram of a display panel according to an embodiment of the present disclosure.

In order to better understand technical solutions of the present disclosure, the embodiments of the present disclosure are described in detail referring to the drawings.

It should be clear that the described embodiments are merely part of the embodiments of the present disclosure rather than all of the embodiments. All other embodiments obtained by those skilled in the art shall fall into the protection scope of the present disclosure.

The terms used in the embodiments of the present disclosure are merely for the purpose of describing specific embodiment, rather than limiting the present disclosure. The terms “a”, “an”, “the” and “said” in a singular form in an embodiment of the present disclosure and the attached claims are also intended to include plural forms thereof, unless noted otherwise.

It should be understood that the term “and/or” used in the context of the present disclosure is to describe a correlation relation of related objects, indicating that there can be three relations, e.g., A and/or B can indicate only A, both A and B, and only B. The symbol “/” in the context generally indicates that the relation between the objects in front and at the back of “/” is an “or” relationship.

In this specification, it should be understood that the terms “basically”, “approximately”, “roughly”, “about”, “generally” and “substantially” described in the claims and embodiments of this disclosure refer to a reasonable process operation range or tolerance range, which can be substantially agreed, rather than an exact value.

It should be understood that although the terms ‘first’, and ‘second’ can be used in the present disclosure to describe transistors, adjusting voltages, scanning lines and the like, these transistors, adjusting voltages, scanning lines and the like should not be limited to these terms. These terms are used only to distinguish the transistors, adjusting voltages, scanning lines from each other. For example, without departing from the scope of the embodiments of the present disclosure, a first transistor can also be referred to as a second transistor. Similarly, the second transistor can also be referred to as the first transistor.

Figure 2:
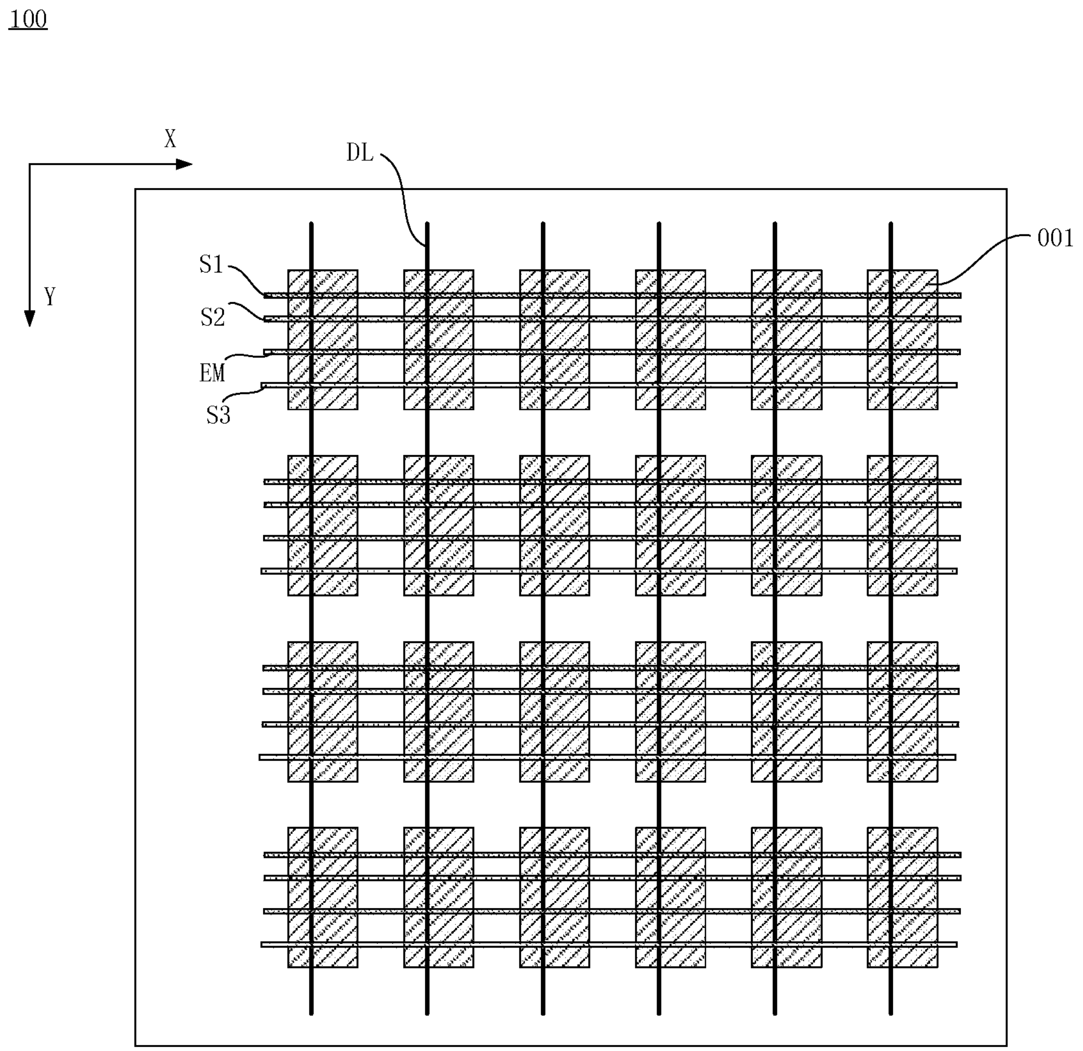
FIG. 2 is a schematic diagram of a display panel according to another embodiment of the present disclosure.
Figure 3:
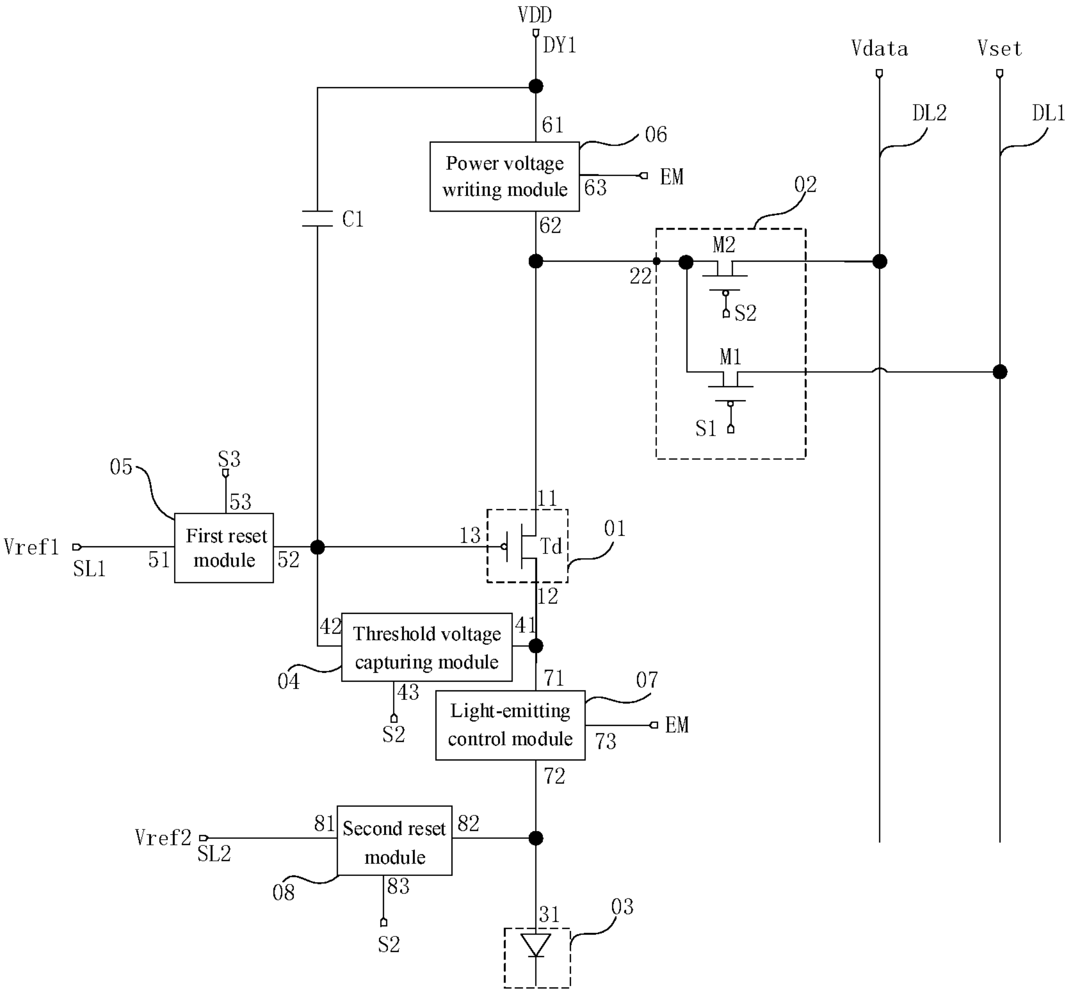
FIG. 3 is a schematic diagram of a pixel circuit of the display panel shown in FIG. 1 according to an embodiment of the present disclosure.
Figure 4:
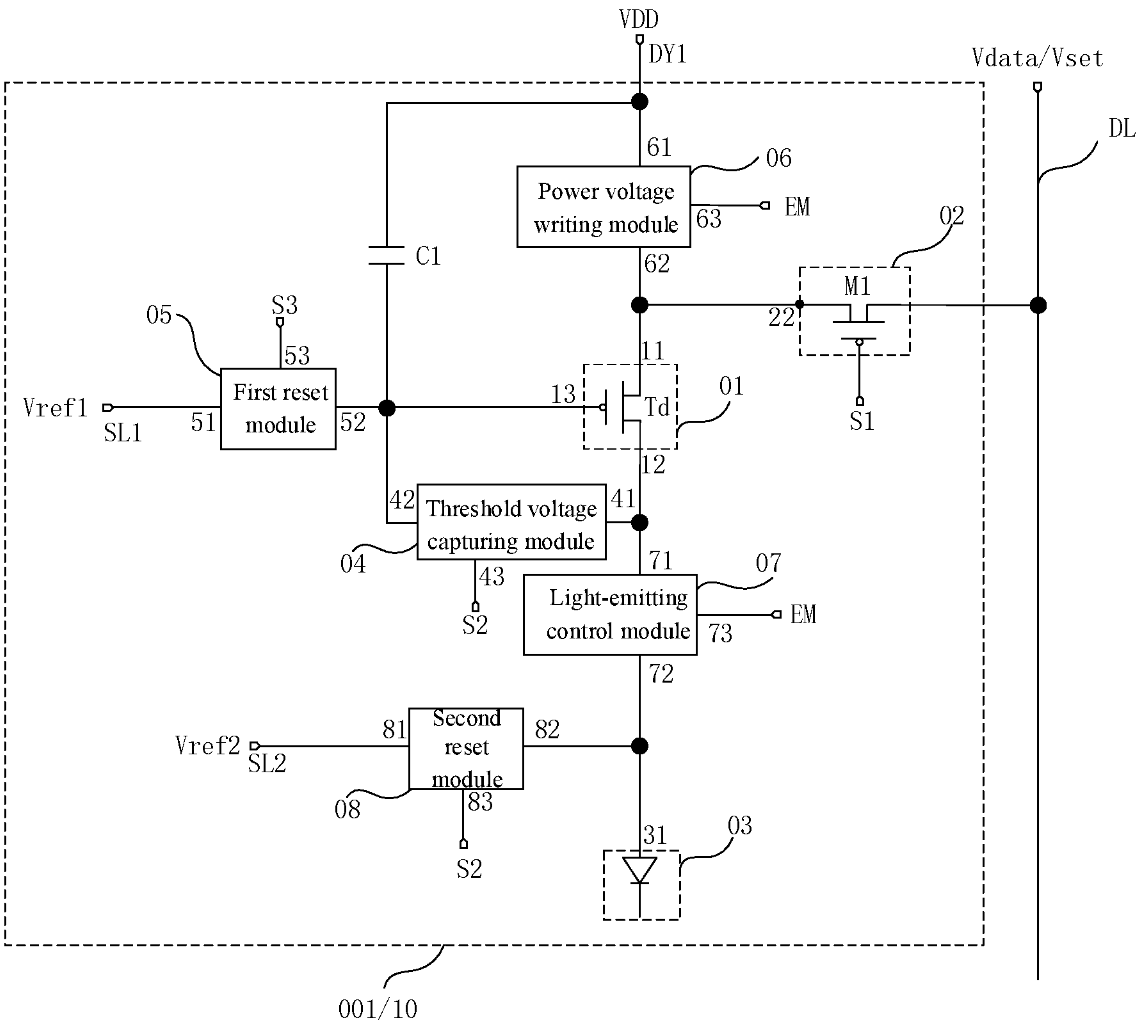
FIG. 4 is a schematic diagram of a pixel circuit of the display panel shown in FIG. 2 according to an embodiment of the present disclosure.
Figure 5:
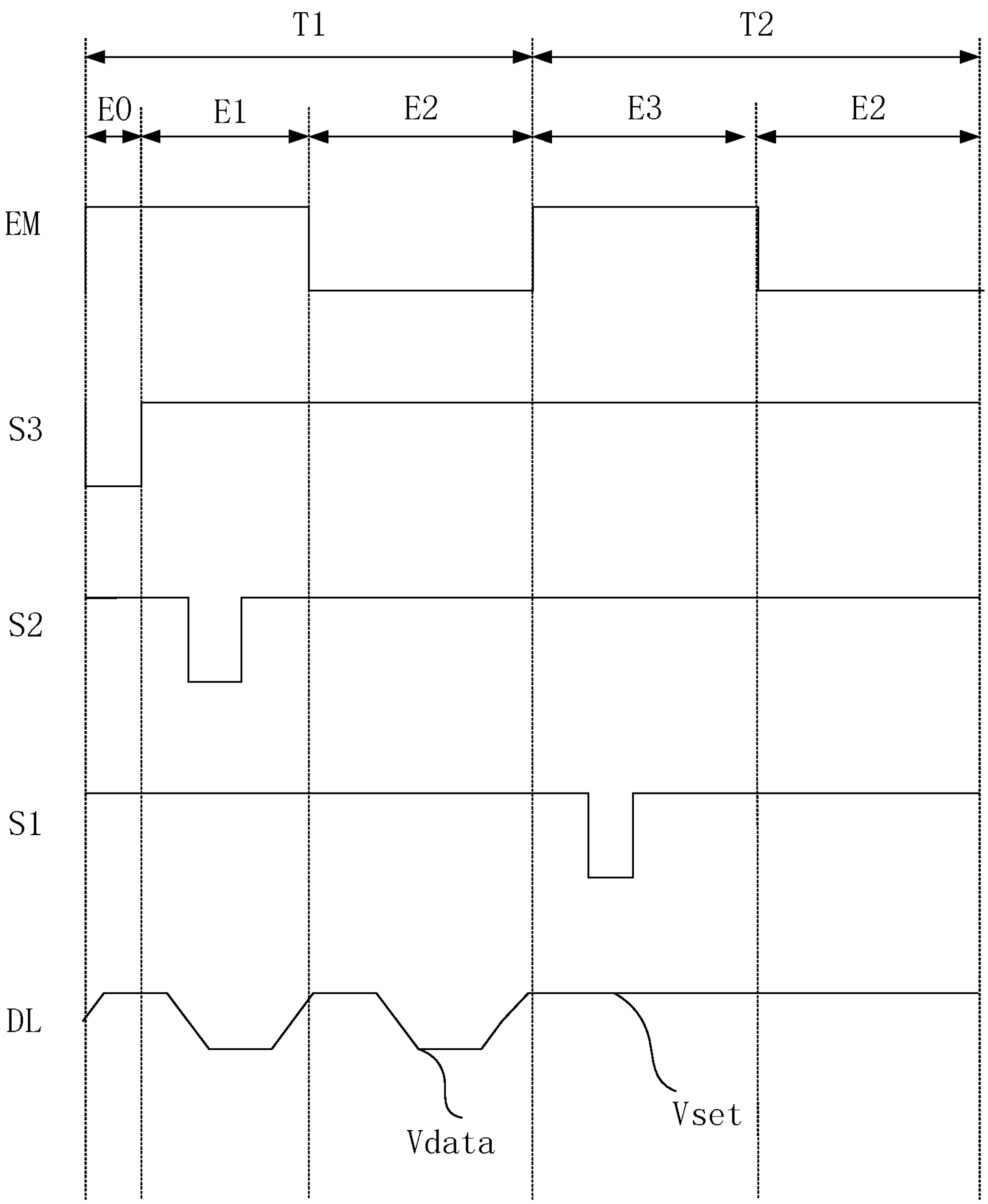
FIG. 5 is an operating timing sequence diagram of the pixel circuit shown in FIG. 3 according to an embodiment of the present disclosure.

FIG. 1 is a schematic diagram of a display panel according to an embodiment of the present disclosure; FIG. 2 is a schematic diagram of a display panel according to another embodiment of the present disclosure; FIG. 3 is a schematic diagram of a pixel circuit of the display panel shown in FIG. 1 according to an embodiment of the present disclosure; FIG. 4 is a schematic diagram of a pixel circuit of the display panel shown in FIG. 2 according to an embodiment of the present disclosure; FIG. 5 is an operating timing sequence diagram of the pixel circuit shown in FIG. 3 according to an embodiment of the present disclosure; and FIG. 6 is an operating timing sequence diagram of the pixel circuit shown in FIG. 4 according to an embodiment of the present disclosure.

Some embodiments of the present disclosure provide a display panel 100. Referring to FIG. 1 and FIG. 3, or FIG. 2 and FIG. 4, the display panel 100 includes multiple data signal lines DL and multiple pixel circuits 001. The data signal lines DL are electrically connected to multiple pixels circuit 001. Multiple data signal lines DL are arranged along the first direction X. The data signal line DL can extend along the second direction Y. Multiple pixel circuits 001 arranged along the second direction Y can be electrically connected to a same data signal line DL.

The pixel circuit 001 includes a driving module 01 and a data voltage writing module 02. The driving module 01 is configured to generate a light-emitting driving current. An output terminal 22 of the data voltage writing module 02 is electrically connected to an input terminal 11 of the driving module 01, and the data voltage writing module 02 is configured to transmit a signal transmitted by the data signal line DL to the input terminal of the driving module 01.

Figure 6:
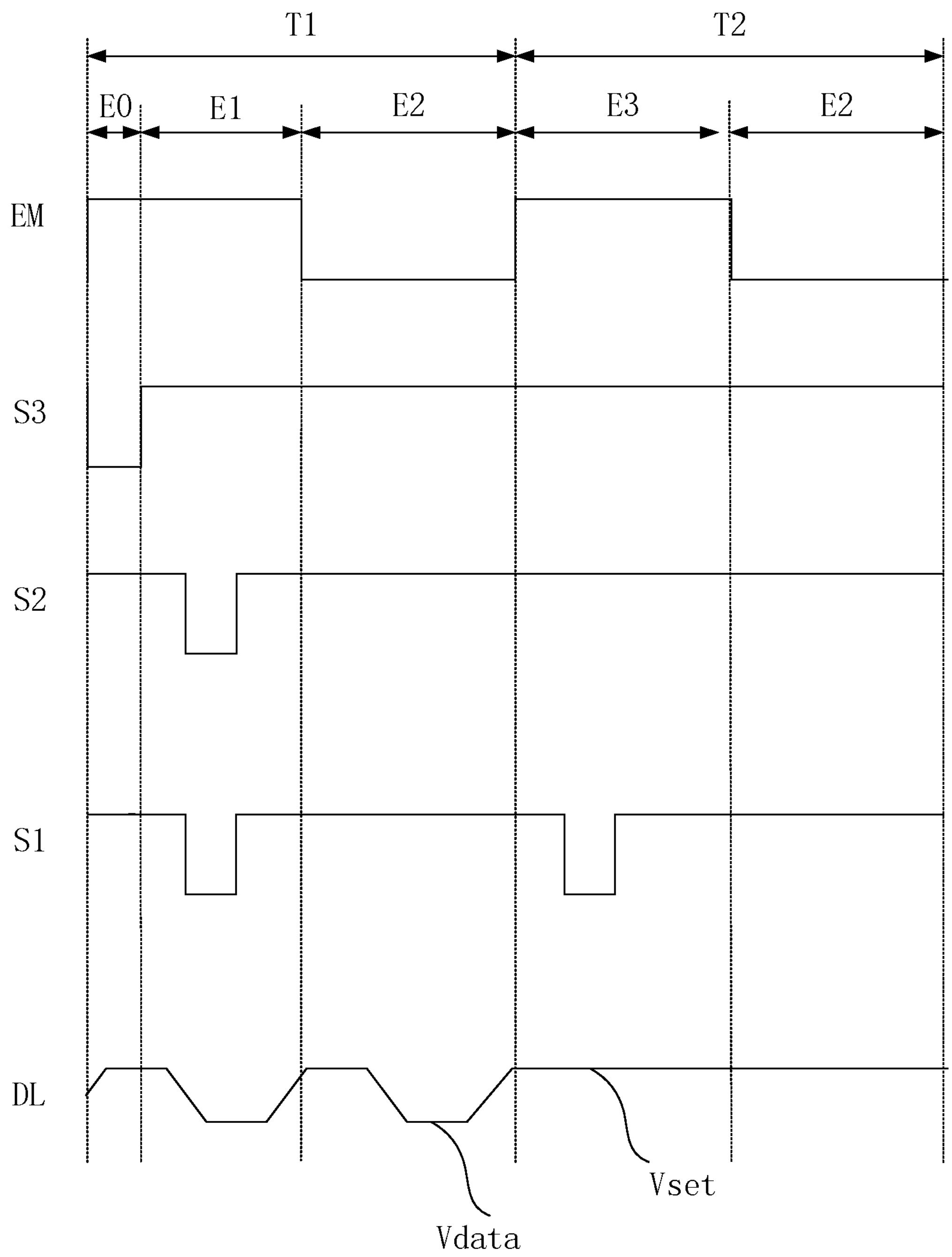
FIG. 6 is an operating timing sequence diagram of the pixel circuit shown in FIG. 4 according to an embodiment of the present disclosure.

As shown in FIG. 5 and FIG. 6, when displaying one frame of an image, the display panel 100 includes a first phase T1 and a second phase T2 performed after the first phase T1. The first phase T1 includes a data writing phase E1 and a first light-emitting phase performed after the data writing phase E1. The second phase T2 includes a adjusting phase E3 and a second light-emitting phase performed after the adjusting phase E3. Each of the first light-emitting phase and the second light-emitting phase is a light-emitting phase E2, and are marked as E2 in the drawings.

It can be understood that, the pixel circuits 001 in the display panel 100 each include a data writing phase E1 and a subsequent light-emitting phase E2, an adjusting phase E3 and a subsequent light-emitting phase E2. Since multiple pixel circuits 001 in the display panel 100 usually enter the data writing phase E1 sequentially in a sequence same as an extending direction of the data signal line DL, the display panel 100 includes multiple data writing phases E1 during the first phase T1 when one frame of the image is displayed, and the multiple data writing phases E1 correspond to the data writing phases E1 performed by multiple pixel circuits 001 in sequence. The pixel circuit 001 in the display panel 100 can also enter the adjusting phase E3 sequentially in a sequence same as the extending direction of the data signal line DL, so that the display panel 100 includes multiple adjusting phases E3 in the second phase T2 when the frame of the image is displayed, the multiple adjusting phases E3 correspond to the adjusting phases E3 sequentially performed by multiple pixel circuits 001.

In some embodiments, the first phase T1 and the second phase T2 that are sequentially performed by the display panel 100 when the frame of the image is displayed can also be equivalent to the first phase T1 and the second phase T2 that are sequentially performed by the pixel circuit 001 when the frame of the image is displayed.

During the data writing phase E1, the data voltage writing module 02 is turned on, and the data signal line DL transmits a data voltage Vdata to the driving module 01 through the data voltage writing module 02 turned on. In the adjusting phase E3, the data voltage writing module 02 is turned on, and at this time, the data signal line DL transmits an adjusting voltage Vset to the driving module 01 through the turned-on data voltage writing module 02. When the display panel displays the frame of the image, the adjusting voltage Vset transmitted by the data signal line DL during the second phase T2 corresponds to the data voltage Vdata transmitted by the data signal line DL during the first phase T1.

In some embodiments of the present disclosure, as shown in FIG. 1, FIG. 3, and FIG. 5, the driving module 01 can include a driving transistor Td configured to generate a light-emitting driving current. A source of the driving transistor Td is electrically connected to an input terminal 11 of the driving module 01, a drain of the driving transistor Td is electrically connected to an output terminal 12 of the driving module 01, and a gate of the driving transistor Td is electrically connected to a control terminal 13 of the driving module 01.

The data signal line DL includes a first data signal sub-line DL1 and a second data signal sub-line DL2. The first data signal sub-line DL1 and the second data signal sub-line DL2 each are electrically connected to multiple pixel circuits 001. Multiple first data signal sub-lines DL1 and multiple second data signal sub-lines DL2 can be arranged in a first direction X, and the first data signal sub-line DL1 and the second data signal sub-line DL2 each can extend in a second direction Y. The data voltage writing module 02 includes a first transistor M1 and a second transistor M2. A source of the first transistor M1 is electrically connected to the first data signal sub-line DL1, and a drain of the first transistor M1 is electrically connected to the input terminal 11 of the driving module 01. A source of the second transistor M2 is electrically connected to the second data signal sub-line DL2, and a drain of the second transistor M2 is electrically connected to the input terminal 11 of the driving module 01.

In some embodiments, the gate of the first transistor M1 can be electrically connected to the first scanning line S1, and the gate of the second transistor M2 can be electrically connected to the second scanning line S2.

During the data writing phase E1, the first scanning line S1 transmits an effective signal to control the first transistor to be turned off, the second scanning line S2 transmits an effective signal to control the second transistor M2 to be turned on, the second data signal sub-line DL2 transmits a data voltage Vdata, and the data voltage Vdata is transmitted to the driving transistor Td through the turned-on second transistor M2.

During the adjusting phase E3, the first scanning line S1 transmits an effective signal to control the first transistor M1 to be turned on, the second scanning line S2 transmits an effective signal to control the second transistor M2 to be turned off, the first data signal sub-line DL1 transmits a adjusting voltage Vset, and the adjusting voltage Vset is transmitted to the driving transistor Td through the turned-on first transistor M1.

In some embodiments, the data signal line DL can be a signal line pair including a first data signal sub-line DL1 and a second data signal sub-line DL2. The first data signal sub-line DL1 of the data signal lines DL is configured to transmit the adjusting voltage Vset, and the second data signal sub-line DL2 of the data signal line DL is configured to transmit the data voltage Vdata.

In some embodiments of the present disclosure, as shown in FIG. 2, FIG. 4 and FIG. 6, the data voltage writing module 02 includes a first transistor M1. A source of the first transistor M1 is electrically connected to the data signal line DL, a drain of the first transistor M1 is electrically connected to the input terminal 11 of the driving module 01, and a gate of the first transistor M1 is electrically connected to the first scanning line S1.

The driving module 01 can include a driving transistor Td. A source of the driving transistor Td is electrically connected to the input terminal 11 of the driving module 01, a drain of the driving transistor Td is electrically connected to the output terminal 12 of the driving module 01, and a gate of the driving transistor Td is electrically connected to the control terminal 13 of the driving module 01.

During the data writing phase E1, the first scanning line S1 transmits an effective signal to control the first transistor M1 to be turned on, the data signal line DL transmits the data voltage Vdata, and the data voltage Vdata is transmitted to the driving transistor Td through the turned-on first transistor M1.

During the adjusting phase E3, the first scanning line S1 transmits an effective signal to control the first transistor M1 to be turned on, the data signal line DL transmits an adjusting voltage Vset, and the adjusting voltage Vset is transmitted to the driving transistor Td through the turned-on first transistor M1.

In some embodiments, the data signal line DL can be only one signal line, and the data signal line DL is configured to transmit both the data voltage Vdata and the adjusting voltage Vset.

When the display panel displays different frames of the image, different data voltages Vdata are transmitted by the data signal line DL during the data writing phase E1, and thus different adjusting voltages Vset are also transmitted by the data signal line DL during the adjusting phase E3.

For example, a gray scale of a pixel in the display panel 100 can be determined according to the data voltage received by the pixel. If the data voltage received by a pixel is Vdata, a gray scale of the pixel is g, so that an optimal adjusting voltage Vset of the pixels when the gray scale of the pixel is g can be obtained through experimental simulation. Therefore, a difference ΔVg between the adjusting voltage Vset and the data voltage Vdata is determined when the gray scale is g. The difference ΔVg and the corresponding grayscale g are stored in a control chip. When the gray scale of the pixels in the display panel 100 during the first phase T1 is g, the data signal line DL that transmits the data voltage Vdata to the pixel transmits the adjusting voltage Vset to the pixel during the adjusting phase E3, where Vset=Vdata+ΔVg (formula 1). According to different pixel gray scales controlled by the data signal line DL, the data signal line DL is controlled to transmit different adjusting voltages Vset during the adjusting phase E3.

When the display panel displays the frame of the image, one data signal line DL can transmit multiple different data voltages Vdata to control the gray scales of multiple pixels. In the above formula 1, Vdata can denote an average value of multiple data voltages Vdata transmitted by the data signal line DL. ΔVg can be a difference between the optimal adjusting voltage Vset and the average value of the multiple data voltages Vdata under an average gray scale of multiple pixels. When the average gray scale of multiple pixels is a non-integer, the gray scale value can be an integer according to the principle of rounding.

In the related art, during the first phase T1 when the display panel 100 displays the frame of the image, in order to make the driving transistor Td generate a required light-emitting driving current, the gate of the driving transistor Td needs to be reset, and then a data voltage Vdata is written to the gate of the driving transistor Td. In order to ensure that during the light-emitting phase E2 of the first phase T1, the driving transistor Td can generate a required light-emitting driving current and transmit it to the light-emitting element 03. During the initial phase during which the light-emitting element 03 emits light, there is a current ramping process, and a speed of the current ramping is associated with the bias state of the driving transistor Td.

However, in the display panel 100 in the related art, during the second phase T2 when the display panel displays the same frame of the image, the gate of the driving transistor Td is no longer reset and the data voltage Vdata is no longer written to the gate of the driving transistor Td, and the gate of the driving transistor Td remains substantially the same potential as the previous light-emitting phase, and generates a light-emitting driving current to be transmitted to the light-emitting element 03. In this way, a large difference between the bias state of the driving transistor Td during the early phase of the light-emitting phase E2 of the second phase T2 and the bias state of the driving transistor Td during the early phase of the light-emitting phase E2 of the first phase T1 is generated, resulting in a large difference between the speed of the current ramping during the first phase T1 and the speed of the current ramping the second phase T2. In this regard, a large difference between the brightness of the display panel during the first phase T1 and the second phase T2 is generated, which affects the normal display of the display panel 100, for example, when the display panel 100 is in a low frequency and low grayscale display state, the flickering problem is very obvious.

In the embodiments of the present disclosure, during the adjusting phase E3 of the second phase T2, the data signal line DL transmits the adjusting voltage Vset to the source of the driving transistor Td in the driving module 01 through the turned-on data voltage writing module 02, so that the bias state of the driving transistor Td can be corrected, and the difference between the bias state of the driving transistor Td during the second phase T2 and the bias state of the driving transistor Td during the first phase T1 can be reduced. Therefore, the difference between the ramping speeds of the current received by the light-emitting element 03 during the first phase T1 and the second phase T2 is reduced, thereby reducing the difference between the brightness of the display panel 100 during the first phase T1 and the brightness of the display panel 100 during the second phase T2, and improving the display effect of the display panel 100.

Considering that the data voltages Vdata received by the driving transistor Td during different data writing phases E1 can be different, the bias states of the driving transistor Td can be different during different first phases T1. Therefore, in the embodiments of the present disclosure, when the same frame of the image is displayed, the adjusting voltage Vset transmitted by the data signal line DL during the adjusting phase E3 corresponds to the data voltage Vdata transmitted by the data signal line DL during the data writing phase E1. In this way, the adjusting voltage Vset transmitted by the data signal line DL can be changed according to the change of the data voltage Vdata transmitted by the data signal line DL, thereby minimizing the difference between the bias states of the driving transistor Td during the second phase T2 and the first phase T1 that belong to the same frame of the image, and improving the display effect of the display panel 100.

In an embodiment, if different data voltages Vdata are transmitted by the data signal line DL during different first phases T1, different adjusting voltages Vset are also transmitted by the data signal line DL during the second phase T2 corresponding to the first phase T1. The different first phases T1 can be the first phases T1 of different pixel circuits 001 during the same frame of the image, or can be the first phases T1 of a same pixel circuit 001 during different frames of the image.

According to the data voltage Vdata transmitted by the data signal line DL during the first phase T1, the adjusting voltage Vset corresponding to the data voltage Vdata can be obtained through experimental simulation.

For example, as shown in FIG. 4, multiple pixel circuits 001 include a first pixel circuit 10. The data signal line DL is electrically connected to the first pixel circuit 10. When the display panel 100 displays one frame of an image, the data signal line DL transmits the data voltage Vdata during the first phase T1. During the second phase T2, the adjusting voltage Vset of the light-emitting element 03 in the first pixel circuit 10 that causes the difference between the brightness of the display panel during the second phase T2 and the brightness of the display panel during the first phase T1 to be within a preset range is obtained through experimental simulation. At this time, the adjusting voltage Vset is the adjusting voltage Vset corresponding to the data voltage Vdata transmitted by the data signal line DL during the first phase T1.

Since a same data signal line DL can be electrically connected to multiple pixel circuits 001, when one frame of an image is displayed, the data signal line DL can transmit multiple different data voltages Vdata during the first phases T1 of different pixel circuits 001, then during the second phases T2 of the different pixel circuits 001, the data signal line DL can transmit a adjusting voltage Vset corresponding to an average value of multiple different data voltages Vdata transmitted by the data signal line DL during the first phases T1. That is, when the same frame of the image is displayed, the data signal line DL can transmit only one adjusting voltage Vset during the second phase T2, and the adjusting voltage Vset corresponds to the average value of multiple data voltages Vdata transmitted by the data signal line DL during the first phase T1. The adjusting voltage Vset is configured so that a difference between an overall brightness of the light-emitting elements 03 in multiple pixel circuits 001 connected to the data signal line DL during the second phase T2 and their overall brightness during the first phase T1 is within a preset range.

When a same frame of the image is displayed, the data signal line DL can also transmit multiple adjusting voltages Vset during the second phases T2 of different pixel circuits 001, and each adjusting voltage Vset corresponds to an average value of at least one data voltages Vdata transmitted by the data signal line DL during the first phases T1 of different pixel circuits 001.

The average value of multiple data voltages Vdata can be an arithmetic average value of the multiple data voltages Vdata, or can be a geometric average value of the multiple data voltages Vdata.

Figure 7:
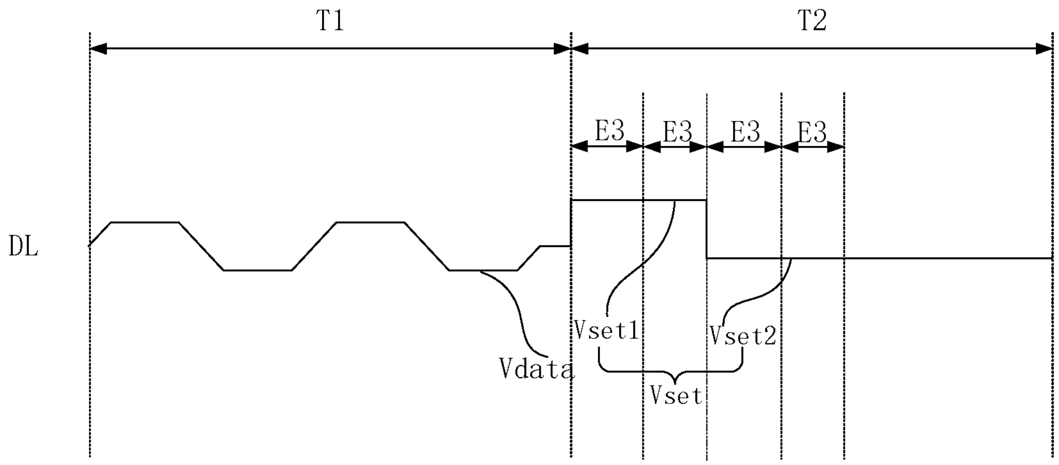
FIG. 7 is an operating timing sequence diagram of a display panel according to an embodiment of the present disclosure.

FIG. 7 is an operating timing sequence diagram of a display panel according to an embodiment of the present disclosure.

In some embodiments of the present disclosure, during multiple adjusting phases E3 of one frame of an image, the data signal line DL transmits at least two different adjusting voltages Vset.

When the display panel displays a frame of an image, multiple pixel circuits 001 connected to one data signal line DL execute the adjusting phase E3 in sequence, that is to say, when the display panel displays the frame of the image, the display panel includes multiple adjusting phases E3 corresponding to multiple pixel circuits 001. In some embodiments of the present disclosure, during at least two adjusting phases E3 of the frame of the image, the data signal line DL transmits different different adjusting voltages Vset.

For example, as shown in FIG. 7, when the frame of the image is displayed, the second phase T2 of the display panel can include four adjusting phases E3. During the four adjusting phases E3, the data signal line DL transmits a first adjusting voltage Vset1 and a second adjusting voltage Vset2, and the first adjusting voltage Vset1 and the second adjusting voltage Vset2 are different adjusting voltages Vset with different voltage values. During the four adjusting phases E3, the data signal line DL can also transmit four different adjusting voltages Vset, so that the adjusting voltages Vset during the four adjusting phases E3 are different from each other. In some embodiments, as shown in FIG. 7, the data voltage Vdata transmitted by the data signal line DL increases to a high level at the beginning of the first phase T1. In some other embodiments, the data voltage Vdata transmitted by the data signal line DL decreases to a low level at the beginning of the first phase T1.

The embodiments of the present disclosure can ensure that during a same frame of the image, when the data signal line DL transmits the data voltages Vdata with a large potential difference to multiple pixel circuits 001 electrically connected to the data signal line DL during the first phase T1, the correction accuracy of the bias states of the driving transistors Td in multiple pixel circuits 001 is improved. Therefore, the difference between the bias states of the driving transistors Td in multiple pixel circuits 001 during the second phase T2 and the first phase T1 can be reduced, improving the display effect of the display panel 100.

In some embodiments of the present disclosure, referring to FIG. 1 and FIG. 5, among multiple pixel circuits 001 electrically connected to a same data signal line DL, i pixel circuits 001 arranged consecutively receive the first adjusting voltage Vset1, and j pixel circuits 001 arranged consecutively receive the second adjusting voltage Vset2, where $i \geq 1$, $j \geq 1$. The first adjusting voltage Vset1 and the second adjusting voltage Vset2 have different voltage values.

The first adjusting voltage Vset1 corresponds to an average value of the data voltages Vdata received by the i pixel circuits 001 arranged consecutively. The second adjusting voltage Vset2 corresponds to an average value of the data voltages Vdata received by the j pixel circuits 001 arranged consecutively.

In some embodiments, multiple pixel circuits 001 electrically connected to a same data signal line DL are divided into two groups, the pixel circuits 001 arranged continuously in one of the two groups receive the first adjusting voltage Vset1, and the pixel circuits 001 arranged continuously in the other group of the two groups receive the second adjusting voltage Vset2.

This technical solution can reduce the times of jumping of the adjusting voltage Vset transmitted by the data signal line DL while ensuring the correction effect of the bias state of the driving transistors Td in multiple pixel circuits 001, thereby reducing the power consumption of the display panel 100.

Figure 8:
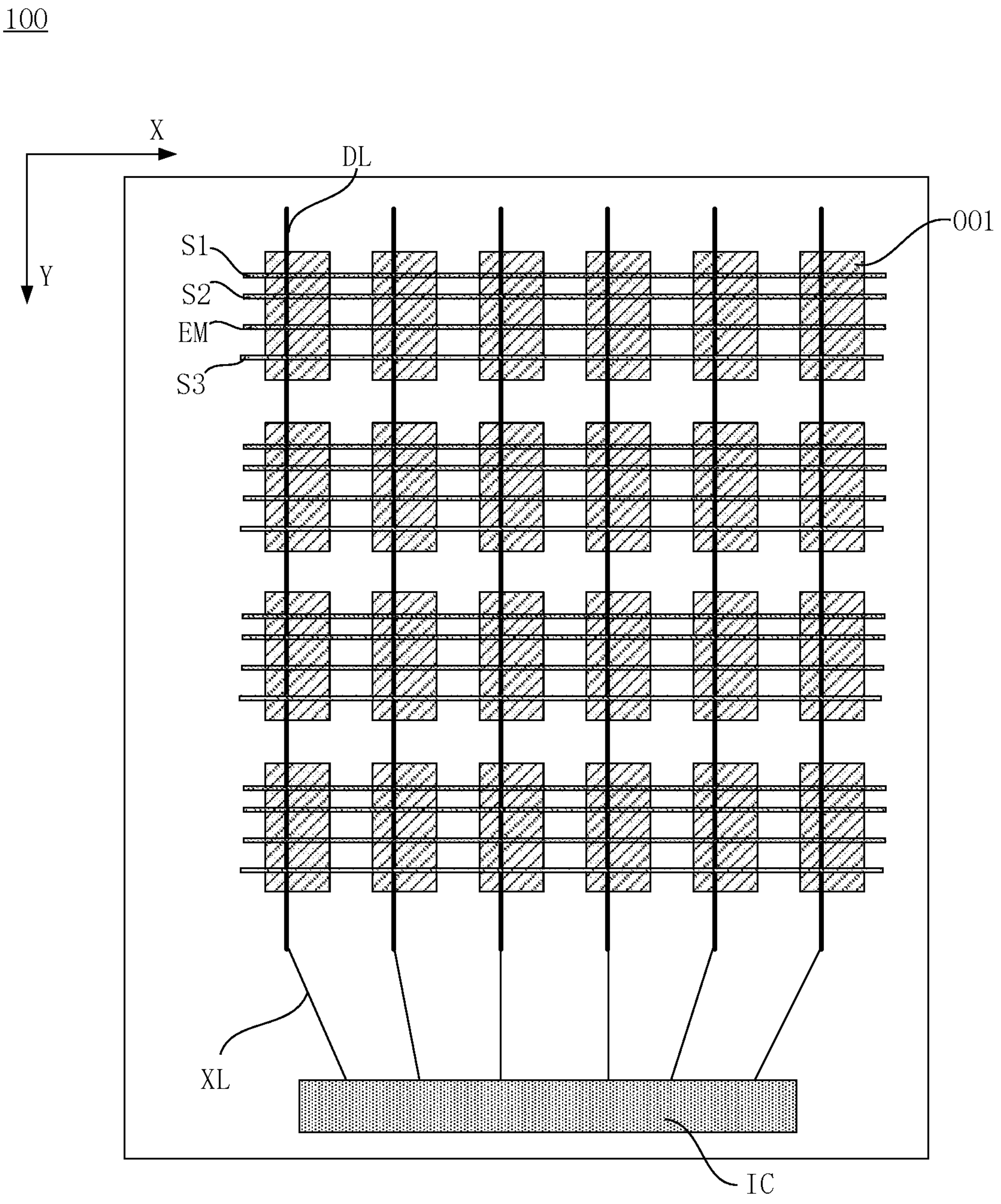
FIG. 8 is a schematic diagram of a display panel according to another embodiment of the present disclosure.
Figure 9:
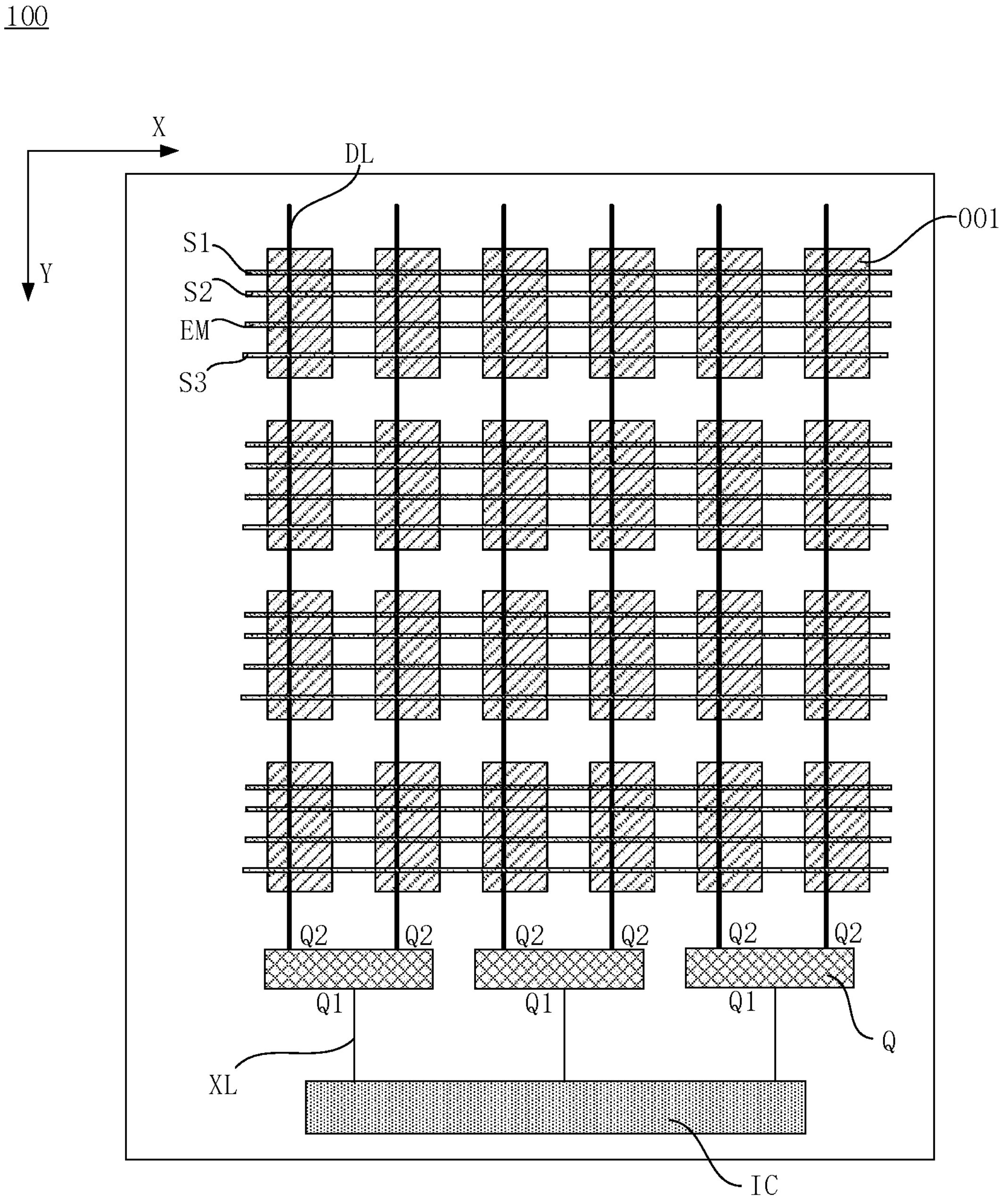
FIG. 9 is a schematic diagram of a display panel according to another embodiment of the present disclosure.

FIG. 8 is a schematic diagram of a display panel according to another embodiment of the present disclosure, and FIG. 9 is a schematic diagram of a display panel according to another embodiment of the present disclosure.

In some embodiments of the present disclosure, as shown in FIG. 8 and FIG. 9, the display panel 100 includes multiple first signal lines XL, and the first signal line XL is electrically connected to M data signal lines DL, where $M \geq 1$. That is, one first signal line XL can be electrically connected to one or more data signal lines DL.

For example, as shown in FIG. 8, one first signal line XL is electrically connected to only one data signal line DL. As shown in FIG. 9, one first signal line XL is electrically connected to multiple data signal lines DL (FIG. 9 only illustrates the case where one first signal line XL is electrically connected to two data signal lines DL).

The first signal line XL is configured to transmit the data voltage Vdata and the adjusting voltage Vset to the data signal line DL electrically connected to the first signal line XL.

In some embodiments, as shown in FIG. 8 and FIG. 9, the display panel 100 includes an integrated circuit board IC, the first signal line XL is electrically connected between the integrated circuit board IC and the data signal line DL and can be located in a fan-shaped wiring region. During the data writing phase E1, the integrated circuit board IC transmits the data voltage Vdata to the data signal line DL through the first signal line XL. During the adjusting phase E3, the integrated circuit board IC transmits the adjusting voltage Vset to the data signal line DL through the first signal line XL.

When the display panel displays the frame of the image, the adjusting voltage Vset transmitted by the first signal line XL corresponds to the average value of at least one data voltage of the data voltages Vdata that are sequentially transmitted to the M data signal lines DL.

That is to say, when the frame of the image is displayed, the first signal line XL can transmit the adjusting voltages Vset corresponding to the data voltages Vdata in a one-to-one correspondence, or can transmit the adjusting voltage Vset corresponding to the average value of the multiple data voltages Vdata transmitted by the first signal line XL.

When one first signal line XL is electrically connected to multiple data signal lines DL, the first signal line XL is electrically connected to multiple pixel circuits 001 through multiple data signal lines DL, and multiple pixel circuits 001 are arranged along the first direction X and the second direction Y. The first direction X can be a row direction in the display panel 100, and the second direction Y can be a column direction in the display panel 100.

In multiple pixel circuits 001 electrically connected to a same first signal line XL, when the adjusting voltage Vset transmitted by the first signal line XL corresponds to the average value of multiple data voltages Vdata transmitted by the first signal line XL, the adjusting voltage Vset at least corresponds to the average value of the data voltage Vdata received by one row of pixel circuits 001.

Figure 10:
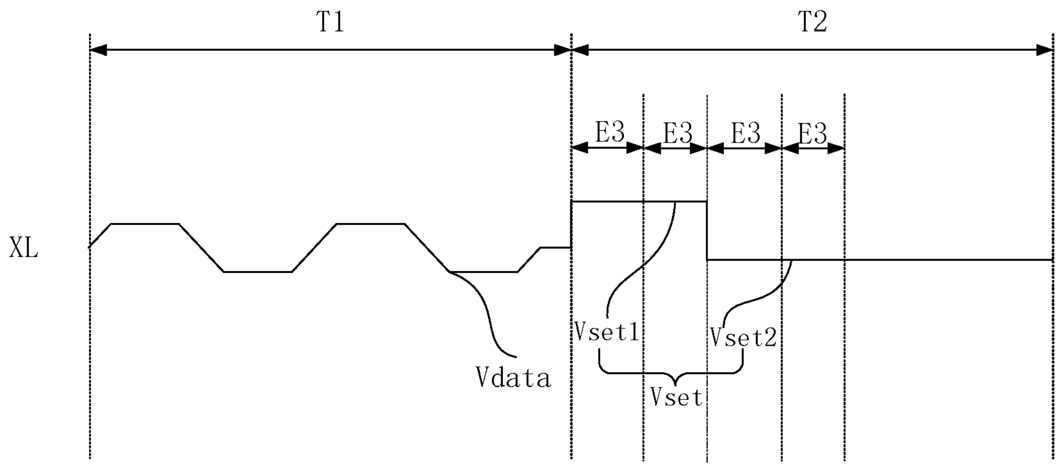
FIG. 10 is an operating timing sequence diagram of a display panel according to another embodiment of the present disclosure.

FIG. 10 is an operating timing sequence diagram of a display panel according to another embodiment of the present disclosure.

In some embodiments of the present disclosure, referring to FIG. 8 and FIG. 10, or FIG. 9 and FIG. 10, when the frame of the image is displayed, the first signal line XL transmits at least two different adjusting voltages Vset to the data signal line DL. FIG. 10 only illustrates two different adjusting voltages Vset1 and Vset2.

The first signal line XL can be electrically connected to multiple pixel circuits 001 through the data signal line DL, and the embodiments of the present disclosure can ensure that during the same frame of the image, when the first signal line XL transmits different data voltages Vdata to multiple pixel circuits 001 electrically connected to the first signal line XL, the correction accuracy of the bias states of the driving transistors Td in multiple pixel circuits 001 is improved. Therefore, the difference between the bias state of the driving transistor Td in multiple pixel circuits 001 during the second phase T2 and the bias state of the driving transistor Td in multiple pixel circuits 001 during the first phase T1 can be reduced, thereby improving the display effect of the display panel 100.

In some embodiments of the present disclosure, referring to FIG. 8 and FIG. 9, and in conjunction with FIG. 10, in multiple rows of pixel circuits 001 electrically connected to the M data signal lines DL, i rows of pixel circuits 001 arranged continuously receive the first adjusting voltage Vset1, j rows of pixel circuits 001 arranged consecutively receive the second adjusting voltage Vset2, and the first adjusting voltage Vset1 and the second adjusting voltage Vset2 are adjusting voltages Vset with different voltage values, where $i \geq 1$, $j \geq 1$. In some embodiments, as shown in FIG. 10, the data voltage Vdata transmitted by the first signal line XL increases to a high level at the beginning of the first phase T1. In some other embodiments, the data voltage Vdata transmitted by the first signal line XL decreases to a low level at the beginning of the first phase T1.

The first adjusting voltage Vset1 corresponds to the average value of the data voltages Vdata received by the i rows of consecutively arranged pixel circuits 001 connected to the M data signal lines DL. The second adjusting voltage Vset2 corresponds to the average value of the data voltage Vdata received by the j rows of consecutively arranged pixel circuits 001 connected to the M data signal lines DL.

Since the M data signal lines DL can be electrically connected to a same first signal line XL, the first signal line XL transmits the first adjusting voltage Vset1 to the i rows of pixel circuits 001 arranged consecutively, and transmits the second adjusting voltage Vset2 to the j rows of pixel circuits 001 arranged consecutively. The first signal line XL transmits the first adjusting voltage Vset1 and the second adjusting voltage Vset2 in time division.

In some embodiments, the multi-row pixel circuits 001 electrically connected to the M data signal lines DL are divided into two groups, wherein the pixel circuits 001 arranged continuously in one of the two groups receive the first adjusting voltage Vset1, and the pixel circuits 001 arranged continuously in the other one of the two groups receive the second adjusting voltage Vset2.

The embodiments of the present disclosure can reduce the times of jumping of the adjusting voltage Vset transmitted by the first signal line XL while ensuring the correction effect of the bias state of the driving transistor Td in the multi rows of pixel circuits 001, thereby reducing the power consumption of the display panel 100.

In some embodiments of the present disclosure, when the frame of the image is displayed, the adjusting voltage Vset transmitted by the first signal line XL corresponds to the average value of all data voltages Vdata transmitted to the M data signal lines DL.

That is to say, during the second phase T2 of the frame of the image, one first signal line XL transmits only one adjusting voltage Vset, and the adjusting voltage Vset corresponds to the average value of all data voltages Vdata transmitted by the first signal line XL during the first phase T1.

In the embodiments of the present disclosure, during the frame of the image, the first signal line XL transmits only one adjusting voltage Vset, which reduces the power consumption of the display panel 100.

When the driving transistor Td receives different data voltages Vdata, the driving transistor Td has different bias states. It can be seen from the above embodiments where the adjusting voltage Vset corresponding to the data voltage Vdata is obtained, that the driving transistor Td will also be provided different adjusting voltages Vset during the second phase T2.

Figure 11:
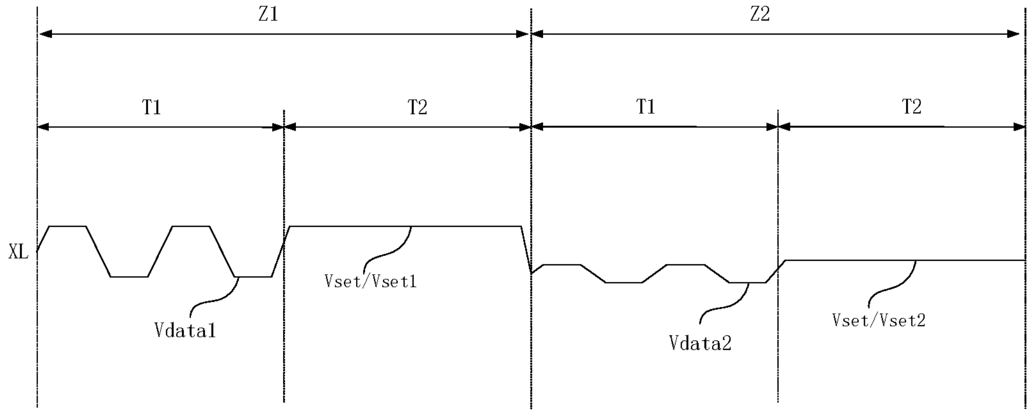
FIG. 11 is an operating timing sequence diagram of a display panel according to another embodiment of the present disclosure.

FIG. 11 is an operating timing sequence diagram of a display panel according to another embodiment of the present disclosure.

In some embodiments of the present disclosure, when an average value of at least two data voltages Vdata transmitted by the first signal line XL during the first phase T1 when one frame of two frames of an image is displayed is different from an average value of at least two data voltages Vdata transmitted by the first signal line XL during the first phase T1 when another frame of the two frames of the image is displayed, the adjusting voltage Vset transmitted by the first signal line XL during the second phase T2 when the one frame of the two frames of the image is displayed is different from the adjusting voltage Vset transmitted by the first signal line XL during the second phase T2 when the another frame of the two frames of the image is displayed.

It can be understood that, since the first signal line XL can be electrically connected to multiple pixel circuits 001 through M data signal lines DL, during the first phase T1 during which the display panel 100 displays one frame of an image, the first signal line XL can transmit multiple data voltages Vdata to multiple pixel circuits 001 electrically connected to the first signal line XL. In the embodiments of the present disclosure, when the average value of at least two data voltages Vdata transmitted by the first signal line XL during the first phase T1 when the display panel 100 displays one frame of the image is different from the average value of at least two data voltages Vdata transmitted by the first signal line XL during the first phase T1 when the display panel 100 displays another frame of the image, the first signal line XL transmits different adjusting voltages Vset during the second phases T2 when the display panel 100 displays the two frames of the image.

For example, as shown in FIG. 11, the first signal line XL transmits multiple data voltages Vdata1 during the first phase T1 when the display panel 100 displays a first frame Z1 of the image. An average value of the multiple data voltages Vdata1 is V1. The signal line XL transmits multiple data voltages Vdata2 during the first phase T1 when the display panel displays a second frame Z2 of the image. An average value of the multiple data voltages Vdata2 is V2. The adjusting voltage Vset transmitted by the first signal line XL during the second phase T2 when the display panel 100 displays the first frame Z1 of the image is the first adjusting voltage Vset1, and the adjusting voltage Vset transmitted by the first signal line XL during the second phase T2 when the display panel 100 displays the second frame Z2 of the image is the second adjusting voltage Vset2. When V1 and V2 have different voltage values, the first adjusting voltage Vset1 and the second adjusting voltage Vset2 have different voltage values.

Figure 12:
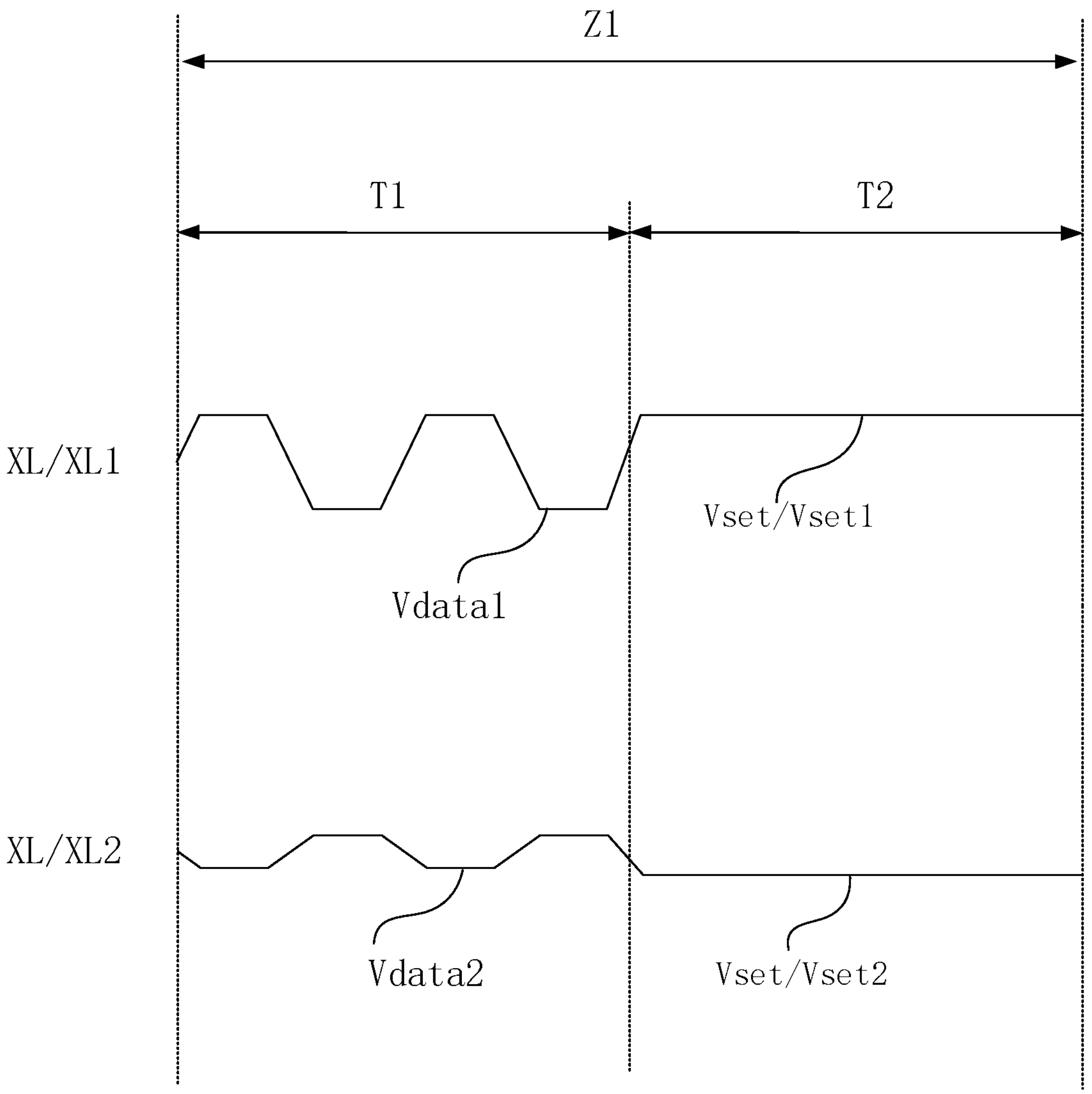
FIG. 12 is an operating timing sequence diagram of a display panel according to another embodiment of the present disclosure.

FIG. 12 is an operating timing sequence diagram of a display panel according to another embodiment of the present disclosure.

In some embodiment of the present disclosure, when the average values of at least two data voltages Vdata respectively transmitted by different first signal lines XL during a same first phase T1 are different, the adjusting voltages Vset transmitted by different first signal lines XL during the second phase T2 corresponding to the first phase T1 are different.

The same first phase T1 can be the first phase T1 when the display panel 100 displays a same frame of the image. The display panel 100 includes multiple first signal lines XL. Different first signal lines XL are electrically connected to different pixel circuits 001 through data signal lines DL. During the first phase of one frame of an image displayed by the display panel 100, different first signal lines XL can transmit multiple data voltages Vdata to multiple pixel circuits 001 electrically connected to the different first signal lines XL, respectively. In some embodiments of the present disclosure, when an average value of at least two of the data voltages Vdata transmitted by one first signal line XL during the first phase T1 of one frame of the image displayed by the display panel 100 is different from the average value of at least two of the data voltages Vdata transmitted by another first signal line XL during this first phase T1, these two first signal lines XL transmit different adjusting voltages Vset during the second phase T2 of the frame of image displayed by the display panel 100.

For example, as shown in FIG. 12, one of multiple first signal lines XL include a first signal sub-line XL1 and a second signal sub-line XL2. The first signal sub-line XL1 transmits multiple data voltages Vdata1 during the first phase T1 of the first frame Z1 of the image displayed by the display panel 100, and an average value of the multiple data voltages Vdata1 is V1. The adjusting voltage Vset transmitted by the first signal sub-line XL1 during the second phase T2 of the first frame Z1 of the image displayed by the display panel 100 is the first adjusting voltage Vset1. The second signal sub-line XL2 transmits multiple data voltages Vdata2 during the first phase T1 of the first frame Z1 of the image displayed by the display panel 100, and an average value of the multiple data voltages Vdata2 is V2. The adjusting voltage Vset transmitted by the second signal sub-line XL2 during the second phase T2 of the first frame Z1 of the image displayed by the display panel 100 is the second adjusting voltage Vset2. When V1 and V2 have different voltage values, the first adjusting voltage Vset1 and the second adjusting voltage Vset2 have different voltage values.

Figure 13:
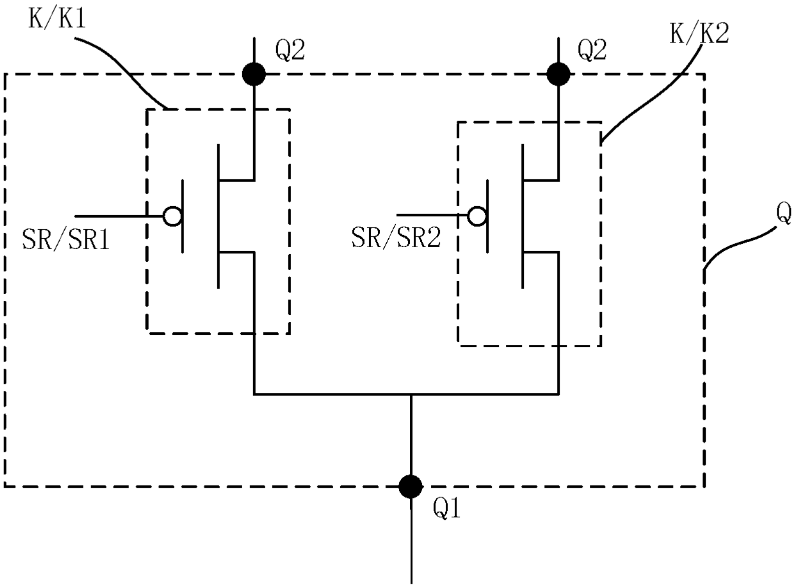
FIG. 13 is a schematic diagram of a demultiplexer according to an embodiment of the present disclosure.

FIG. 13 is a schematic diagram of a demultiplexer according to an embodiment of the present disclosure.

Referring to FIG. 9, in some embodiments of the present disclosure, the display panel 100 includes a demultiplexer Q. An input terminal Q1 of the demultiplexer Q is electrically connected to the first signal line XL, and multiple output terminals Q2 of the demultiplexer Q are electrically connected to the data signal lines DL in a one-to-one correspondence.

During the data writing phase E1, the multiple output terminals Q2 of the demultiplexer Q sequentially output the data voltage Vdata. In the adjusting phase E3, the multiple output terminals Q2 of the demultiplexer Q can simultaneously output the adjusting voltage Vset.

In an embodiment, as shown in FIG. 13, the demultiplexer Q can include multiple switches K. First electrodes of the switches K are electrically connected to each other and electrically connected to the input terminal Q1 of the demultiplexer Q, and second electrodes of the switches K are electrically connected to the output terminal Q2 of the demultiplexer Q in a one-to-one correspondence. The demultiplexer Q also includes multiple control signal lines SR. A control terminal of the switch K is electrically connected to the control signal line SR. A signal transmitted by the control signal line SR controls the multiple output terminals Q2 of the demultiplexer Q to output signals by controlling a switching state of the switch K.

Exemplarily, referring to FIG. 13, the demultiplexer Q can include one input terminal Q1 and two output terminals Q2. Multiple switches K include a first switch K1 and a second switch K2. Multiple control signal lines SR include a first control signal line SR1 and a second control signal line SR2. A control terminal of the first switch K1 is electrically connected to a first control signal line SR1, and a control terminal of the second switch K2 is electrically connected to a second control signal line SR2. A signal transmitted by the first control signal line SR1 controls a switching state of the first switch K1, and a signal transmitted by the second control signal line SR2 controls a switching state of the second switch K2. The switching states of the first switch K1 and the second switch K2 determine whether the output terminal Q2 of the demultiplexer Q outputs a signal received by the input terminal Q1 of the demultiplexer Q or not.

During the data writing phase E1, the first control signal line SR1 and the second control signal line SR2 transmit effective signals in sequence to control the first switch K1 and the second switch K2 to be turned on in sequence, and the data voltages Vdata transmitted by the first signal line XL are sequentially transmitted to each data signal line DL through the first switch K1 and the second switch K2 that are turned on in sequence.

During the adjusting phase E3, the first control signal line SR1 and the second control signal line SR2 transmit effective signals synchronously to control the first switch K1 and the second switch K2 to be turned on synchronously, and the adjusting voltages Vset transmitted by the first signal line XL are simultaneously transmitted to each data signal line DL through the first switch K1 and the second switch K2 that are turned on.

In some embodiments, the adjusting voltage Vset output by the demultiplexer Q corresponds to an average value of all data voltages Vdata output by the demultiplexer Q during the data writing phase E1.

In the embodiments of the present disclosure, the demultiplexer Q simultaneously outputs the adjusting voltage Vset during the adjusting phase E3, so that it is beneficial to reduce the switching times of the multiple switches K in the demultiplexer Q, thereby reducing the power consumption of the display panel 100.

Referring to FIG. 4 and FIG. 6, in some embodiments of the present disclosure, the driving module 01 includes a driving transistor Td, and an output terminal 22 of the data voltage writing module 02 is electrically connected to the source of the driving transistor Td. The pixel circuit 001 also includes a threshold voltage capturing module 04. An input terminal 41 of the threshold voltage capturing module 04 is electrically connected to a drain of the driving transistor Td, an output terminal 42 of the threshold voltage capturing module 04 is electrically connected to a gate of the driving transistor Td, and a control terminal 43 of the threshold voltage capturing module 04 is electrically connected to the second scanning line S2.

During the data writing phase E1, the second scanning line S2 transmits an effective signal to control the threshold voltage capturing module 04 to be turned on. Since the data voltage writing module 02 is also turned on at this time, the data voltage Vdata transmitted by the data signal line DL can be transmitted to the source of the driving transistor Td, so that a potential of the source of the driving transistor Td is greater than a potential of the gate the driving transistor Td, thereby enabling the driving transistor Td to be turned on, and the data voltage Vdata is transmitted to the gate of the driving transistor Td through the turned-on driving transistor Td and the turned-on threshold voltage capturing module 04.

During the adjusting phase E3, the second scanning line S2 transmits an effective signal to control the threshold voltage capturing module 04 to be turned off. It is avoided that the adjusting voltage Vset is transmitted to the gate of the driving transistor Td, so as to avoid affecting the accuracy of the light-emitting driving current generated by the driving transistor Td during the second phase T2.

In some embodiments of the present disclosure, referring to FIG. 4 and FIG. 6, the pixel circuit 001 includes a first reset module 05. An input terminal 51 of the first reset module is electrically connected a the first reset line SL1, an output terminal 52 of the first reset module 05 is electrically connected to the gate of the driving transistor Td, and a control terminal 53 of the first reset module 05 is electrically connected to a third scanning line S3. The first phase T1 also includes a reset phase E0, which is performed before the data writing phase E1.

During the reset phase E0, the third scanning line S3 transmits an effective signal to control the first reset module 05 to be turned on, and the first reset line SL1 transmits a first reset voltage Vref1. The first reset voltage Vref1 is transmitted to the gate of the transistor Td through the turned-on first reset module 05 to reset the gate of the driving transistor Td.

During the adjusting phase E3, the third scanning line S3 transmits an effective signal to control the first reset module 05 to be turned off, so as to prevent the first reset voltage Vref1 from being transmitted to the gate of the driving transistor Td, thereby avoiding affecting the accuracy of the light-emitting driving current generated by the driving transistor Td during the second phase T2.

Referring to FIG. 4, in some embodiments of the present disclosure, the pixel circuit 001 includes a power voltage writing module 06 and a light-emitting control module 07. The power voltage writing module 06 is connected between a power voltage signal line DY1 and the source of the driving transistor Td. The light-emitting control module 07 is connected between the drain of the driving transistor Td and the light-emitting element 03.

In some embodiments, an input terminal 61 of the power voltage writing module 06 is electrically connected to the power voltage signal line DY1, and an output terminal 62 is electrically connected to the source of the driving transistor Td. An input terminal 71 of the light-emitting control module 07 is electrically connected to the drain of the driving transistor Td, and an output terminal 72 of the light-emitting control module 07 is electrically connected to the light-emitting element 03.

A control terminal 63 of the power voltage writing module 06 and a control terminal 73 of the light-emitting control module 07 are both electrically connected to a light-emitting control signal line EM, and a signal transmitted by the light-emitting control signal line EM controls a switching state of the power voltage writing module 06 to be the same as the switching state of the light-emitting control module 07.

During the light-emitting phase E2, the light-emitting control signal line EM transmits an effective signal to control the power voltage writing module 06 and the light-emitting control module 07 to be turned on. During a non-light-emitting phase, the light-emitting control signal line EM transmits an effective signal to control the power voltage writing module 06 and the light-emitting control module 07 to be turned off.

Figure 14:
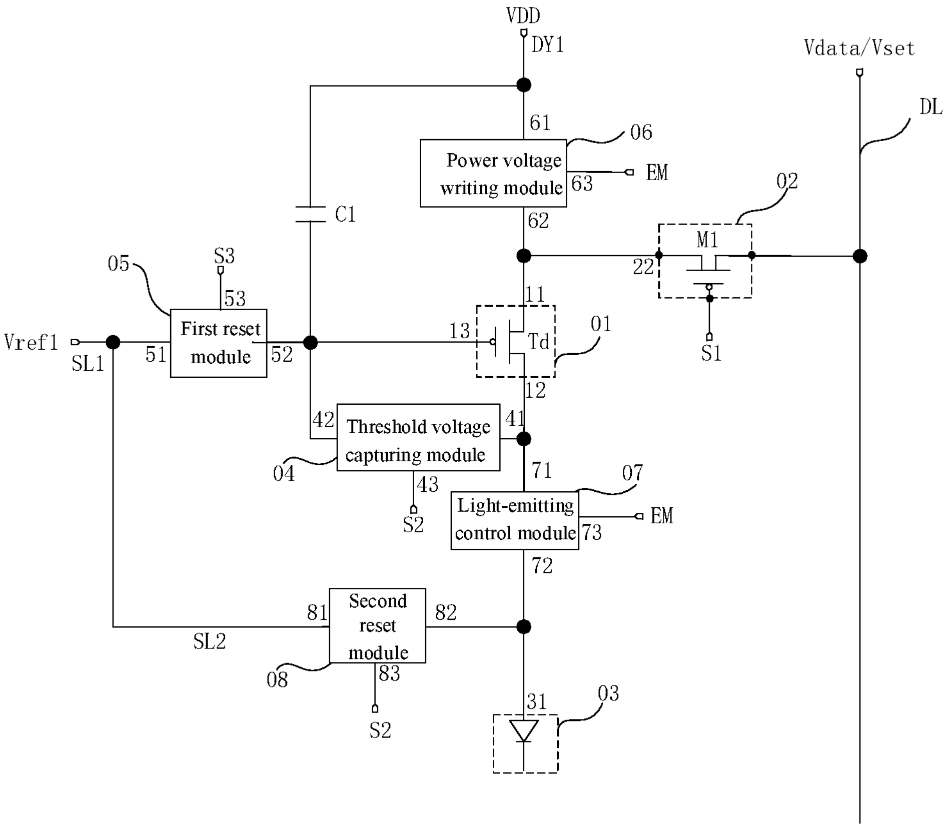
FIG. 14 is a schematic diagram of a pixel circuit of a display panel according to another embodiment of the present disclosure.

FIG. 14 is a schematic diagram of a pixel circuit of a display panel according to another embodiment of the present disclosure.

In some embodiments of the present disclosure, as shown in FIG. 4, the pixel circuit 001 includes a second reset module 08. An input terminal 81 of the second reset module 08 is electrically connected to a second reset line SL2, an output terminal 82 of the second reset module 08 is electrically connected to a first electrode 31 of the light-emitting element 03, and a control terminal 83 of the second reset module 08 is electrically connected to the second scanning line S2.

A signal transmitted by the second scanning line S2 controls a switching state of the second reset module 08 to be the same as the switching state of the threshold voltage capturing module 04.

In some embodiment, the second reset module 08 is configured to reset the light-emitting element 03. During the data writing phase E1, the second reset module 08 is turned on, and at the same time, the second reset line SL2 transmits a second reset voltage Vref2. The second reset voltage Vref2 is transmitted to the first electrode 31 of the light-emitting element 03 through the turned-on second reset module 08, so as to reset the light-emitting element 03. In some embodiments, the light-emitting element 03 is an organic light-emitting diode, and the second reset voltage Vref2 resets an anode of the organic light-emitting diode.

In an embodiment, as shown in FIG. 14, the first reset line SL1 is electrically connected to the second reset line SL2. That is, the first reset voltage Vref1 is reused as the second reset voltage Vref2.

Figure 15:
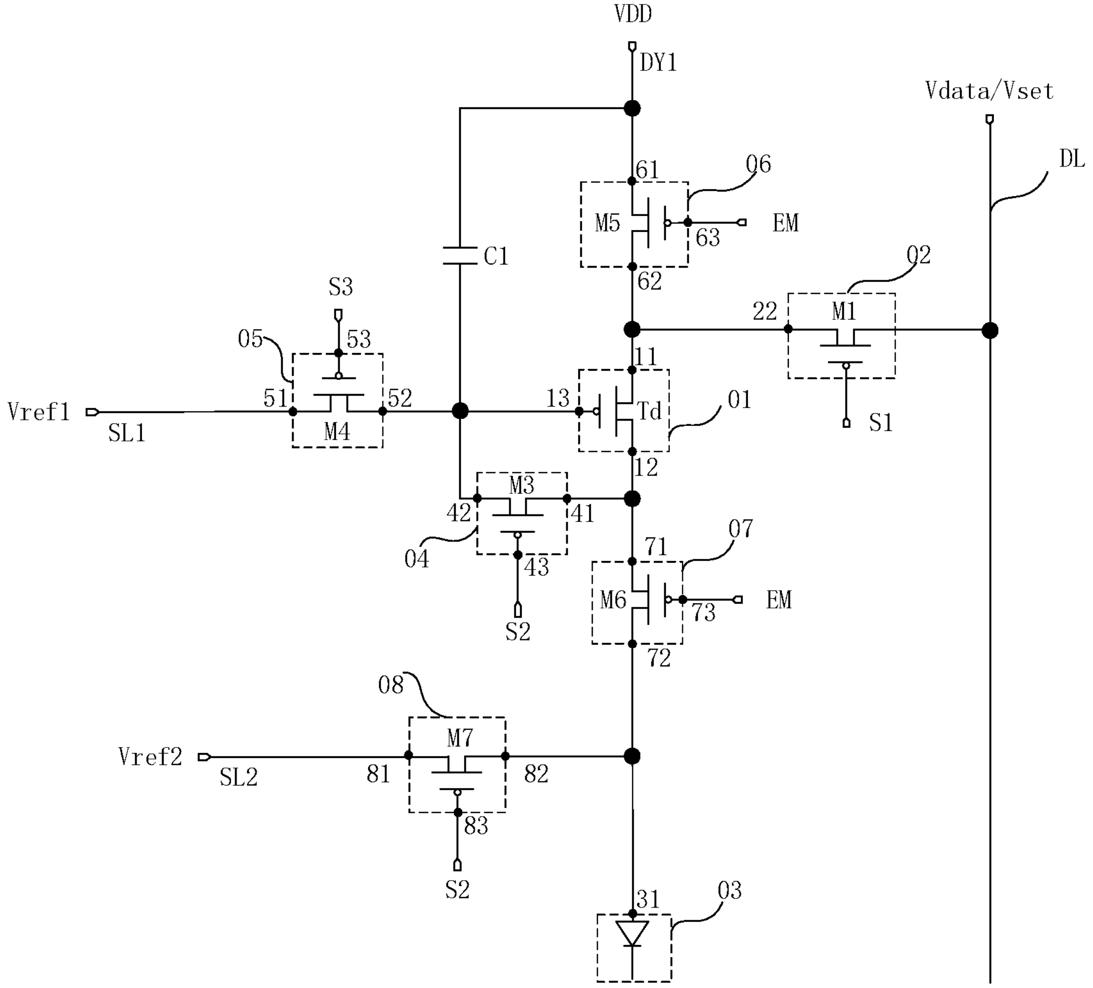
FIG. 15 is a schematic diagram of the pixel circuit shown in FIG. 4 according to an embodiment of the present disclosure.

FIG. 15 is a schematic diagram of the pixel circuit shown in FIG. 4 according to an embodiment of the present disclosure.

As shown in FIG. 15, in some embodiments of the present disclosure, the drain of the first transistor M1 is electrically connected to the source of the driving transistor Td, and the gate of the first transistor M1 is electrically connected to the first scanning line S1.

The threshold voltage capturing module 04 includes a third transistor M3. A source of the third transistor M3 is electrically connected to the drain of the driving transistor Td, a drain of the third transistor M3 is electrically connected to the gate of the driving transistor Td, and a gate of the third transistor M3 is electrically connected to the second scanning line S2.

During the data writing phase E1, the first scanning line S1 transmits an effective signal to control the first transistor M1 to be turned on, and the second scanning line S2 transmits an effective signal to control the third transistor M3 to be turned on, thereby ensuring that the data voltage Vdata can be transmitted to the gate of the driving transistor Td.

During the adjusting phase E3, the first scanning line S1 transmits an effective signal to control the first transistor M1 to be turned on, and the second scanning line S2 transmits an effective signal to control the third transistor M3 to be turned off, so as to prevent the data voltage Vdata from being transmitted to the gate of the driving transistor Td, thereby avoiding affecting the accuracy of the light-emitting driving current generated by the driving transistor Td in the second phase T2.

In some embodiments, the third transistor M3 includes a metal oxide active layer.

In some embodiments, the metal oxide active layer can be an indium gallium zinc oxide (IGZO) active layer. Since the oxide semiconductor transistor has a low off-state leakage current, the third transistor M3 can effectively reduce the influence of the leakage current on the stability of the gate potential of the driving transistor Td, which is beneficial to realize the low-frequency driving stability of the pixel driving circuit 001.

Figure 16:
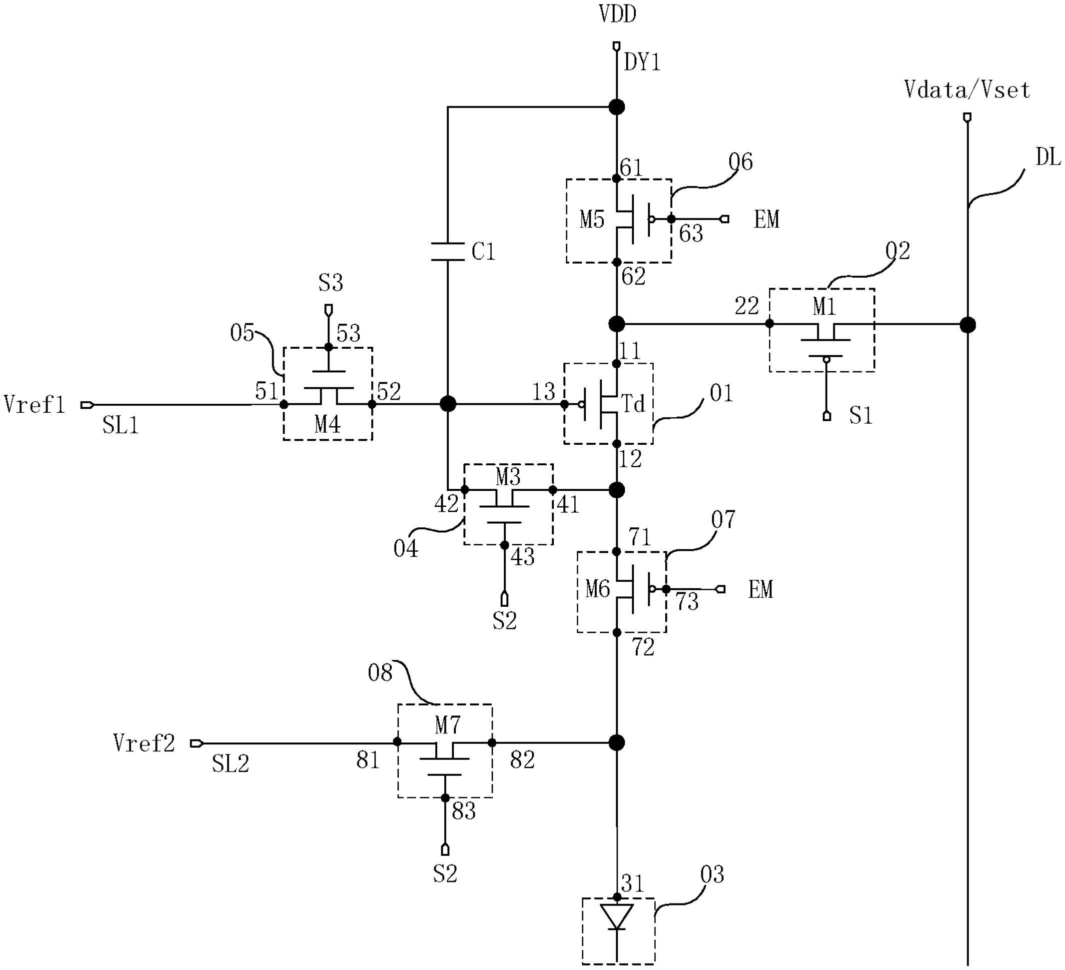
FIG. 16 is a schematic diagram of the pixel circuit shown in FIG. 4 according to another embodiment of the present disclosure.

In some embodiments of the present disclosure, referring to FIG. 16, the first reset module 05 includes a fourth transistor M4, a source of the fourth transistor M4 is electrically connected to the first reset line SL1, a drain of the fourth transistor M4 is electrically connected to the gate of the driving transistor Td, and a gate of the fourth transistor M4 is electrically connected to the third scanning line S3.

During the reset phase E0, the third scanning line S3 transmits an effective signal to control the fourth transistor M4 to be turned on, and the first reset voltage Vref1 transmitted by the first reset line SL1 can be transmitted to the gate of the driving transistor Td through the turned-on fourth transistor M4, so as to reset the gate of the driving transistor Td.

During the adjusting phase E3, the third scanning line S3 transmits an effective signal to control the fourth transistor M4 to be turned off, so as to prevent the first reset voltage Vref1 from being transmitted to the gate of the driving transistor Td, thereby avoiding affecting accuracy of the light-emitting driving current generated by the driving transistor Td in the second phase T2.

In some embodiments, the fourth transistor M4 includes a metal oxide active layer.

In some embodiments, the metal oxide active layer can be an indium gallium zinc oxide (IGZO) active layer. Since the oxide semiconductor transistor has a low off-state leakage current, the fourth transistor M4 can effectively reduce the influence of the leakage current on the gate potential stability of the driving transistor Td, which is beneficial to realize the low-frequency driving stability of the pixel driving circuit 001.

Referring to FIG. 15, the power voltage writing module 06 can include a fifth transistor M5. A source of the fifth transistor M5 is electrically connected to the power voltage signal line DY1, a drain of the fifth transistor M5 is electrically connected to the source of the driving transistor Td, and a gate of the fifth transistor M5 is electrically connected to the light-emitting control signal line EM. The light-emitting control module 07 can include a sixth transistor M6. A source of the sixth transistor M6 is electrically connected to the drain of the driving transistor Td, a drain of the sixth transistor M6 is electrically connected to the first electrode 31 of the light-emitting element 03, and a gate of the sixth transistor M6 is electrically connected to the light-emitting control signal line EM. The second reset module 08 can include a seventh transistor M7. A source of the seventh transistor M7 is electrically connected to the second reset line SL2, a drain of the seventh transistor M7 is electrically connected to the first electrode 31 of the light-emitting element 03, and a gate of the seventh transistor M7 is electrically connected to the second scanning line S2. In some embodiments, the pixel circuit 001 includes a first capacitor C1. A first electrode plate of the first capacitor C1 is electrically connected to the power voltage signal line DY1, and a second electrode plate of the first capacitor C1 is electrically connected to the gate of the driving transistor Td.

The timing sequence diagram shown in FIG. 6 can be the timing sequence diagram of the pixel circuit shown in FIG. 15. The operation process of the pixel circuit 001 shown in FIG. 15 will be described below in combination with FIG. 6 and FIG. 15.

Taking the first transistor M1, the third transistor M3, the fourth transistor M4, the fifth transistor M5, the sixth transistor M6, and the seventh transistor M7 being P-type transistors as an example for description below, it is appreciated that, any one of the above transistors can also be an N-type transistor.

As shown in FIG. 6, when displaying one frame of the image, the pixel circuit shown in FIG. 15 executes the first phase T1 and the second phase T2. The first phase T1 includes a reset phase E0, a data writing phase E1, and a light-emitting phase E2. The second phase T2 includes a adjusting phase E3 and a light-emitting phase E2.

During the reset phase E0 of the first phase T1, the third scanning line S3 transmits a turn-on signal, that is, a low level signal, and the fourth transistor M4 is turned on. The first scanning line S1, the second scanning line S2 and the light-emitting control signal line EM all transmit a turn-off signal, i.e., a high level signal, and the first transistor M1, the third transistor M3, the fifth transistor M5, the sixth transistor M6, and the seventh transistor M7 are turned off. Meanwhile, the first reset line SL1 transmits the first reset voltage Vref1. The first reset voltage Vref1 is transmitted to the gate of the driving transistor Td through the turned-on fourth transistor M4, so as to reset the gate of the driving transistor Td. Since the gate of the driving transistor Td is connected to the first capacitor C1, the first reset voltage Vref1 can be stored at the gate of the driving transistor Td.

During the data writing phase E1 of the first phase T1, the first scanning line S1 transmits a turn-on signal, that is, a low-level signal, and the first transistor M1 is turned on; the second scanning line S2 transmits an turn-on signal, that is, a low-level signal, and the third transistor M3 and the seventh transistor M7 are turned on; the third scanning line S3 and the light-emitting control signal line EM transmit a turn-off signal, i.e., a high level signal, and the fourth transistor M4, the fifth transistor M5, and the sixth transistor M6 are turned off. At the same time, the data signal line DL transmits the data voltage Vdata. At the beginning of the data writing phase E1, the gate potential of the driving transistor Td is the first reset voltage Vref1, and the source potential of the driving transistor Td is the data voltage signal Vdata. The potential difference between the source and gates of the driving transistor Td is (Vdata-Vref1) greater than 0. Therefore, the driving transistor Td is turned on, and the data voltage Vdata is transmitted to the gate of the driving transistor Td through the turned-on driving transistor Td and the turned-on third transistor M3, so that the gate potential of the driving transistor Td is gradually increased. When the gate potential of the driving transistor Td is equal to (Vdata-|Vth|), the driving transistor Td is turned off. At this time, due to the presence of the first capacitor C1, during the data writing phase E1, the gate potential of the driving transistor Td is maintained at (Vdata−|Vth|), where Vth is a threshold voltage of the driving transistor Td.

Meanwhile, the second reset line SL2 transmits the second reset voltage Vref2, and the second reset voltage Vref2 resets the first electrode 31 of the light-emitting element 03 through the turned-on seventh transistor M7. In an embodiment, the light-emitting element 03 includes an organic light-emitting diode, and the second reset voltage Vref2 resets the anode of the organic light-emitting diode through the turned-on seventh transistor M7.

During the light-emitting phase E2 of the first phase T1, the first scanning line S1, the second scanning line S2, and the third scanning line S3 all transmit a turned-off signal, that is, a high level signal, and the first transistor M1, the third transistor M3, the fourth transistor M4, and the seventh transistor M7 are all turned off; and the light-emitting control signal line EM transmits a turn-on signal, i.e., a low-level signal, and the fifth transistor M5 and the sixth transistor M6 are turned on. Meanwhile, the power voltage signal line DY1 transmits a power voltage VDD, that is, the potential of the source of the driving transistor Td is the power voltage VDD. Since the potential of the power voltage VDD is greater than the potential of the data voltage Vdata, the driving transistor Td generates a light-emitting driving current and transmits it to the light-emitting element 03 through the sixth transistor M6 to control the light-emitting element 03 to emit light.

During the adjusting phase E3 of the second phase T2, the first scanning line S1 transmits a turn-on signal, i.e., a low-level signal, and the first transistor M1 is turned on; and the second scanning line S2, the third scanning line S3, and the light-emitting control signal line EM all transmit the turn-off signal, i.e., a high level signal, and the third transistor M3, the fourth transistor M4, the fifth transistor M5, the sixth transistor M6, and the seventh transistor M7 are all turned off. Meanwhile, the data signal line DL transmits an adjusting voltage Vset. The adjusting voltage Vset corresponds to the data voltage Vdata transmitted by the data signal line DL during the data writing phase E1. The adjusting voltage Vset is transmitted to the source of the driving transistor Td through the turned-on first transistor M1, so as to adjust the bias state of the driving transistor Td.

The light-emitting phase E2 of the second phase T2 is the same as the light-emitting phase E2 of the first phase T1, which is not repeated herein.

Figure 17:
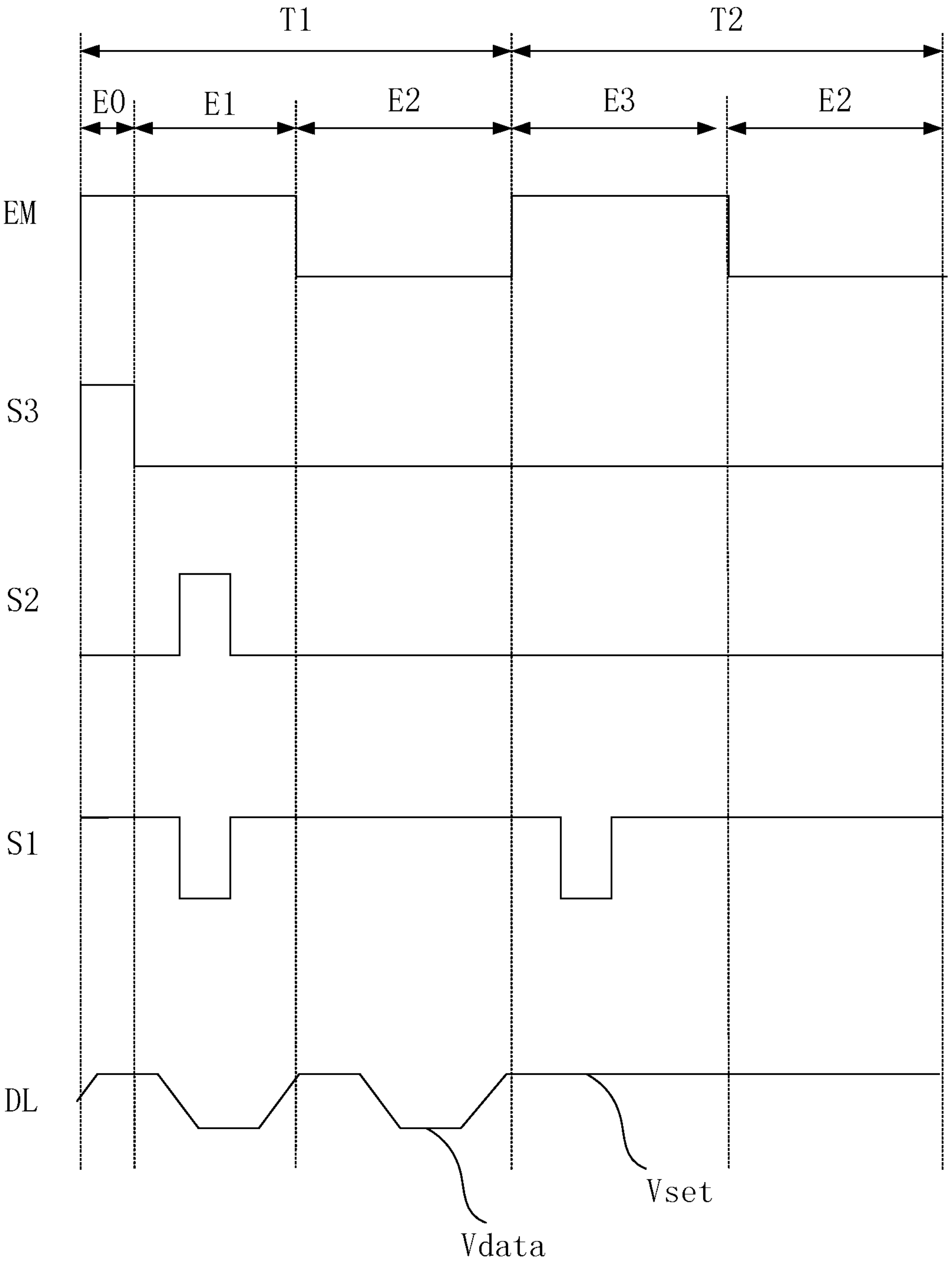
FIG. 17 is an operating timing sequence diagram of the pixel circuit shown in FIG. 16 according to an embodiment of the present disclosure.

FIG. 16 is a schematic diagram of the pixel circuit shown in FIG. 4 according to another embodiment of the present disclosure; and FIG. 17 is an operating timing sequence diagram of the pixel circuit shown in FIG. 16 according to an embodiment of the present disclosure.

The pixel circuit 001 shown in FIG. 16 differs from the pixel circuit 001 shown in FIG. 15 in that the third transistor M3 and the fourth transistor M4 are N-type transistors each including a metal oxide active layer, and the seventh transistor M7 is an N-type transistor including a low temperature polysilicon active layer.

Compared with the timing sequence shown in FIG. 6, the change of timing sequence shown in FIG. 17 lies in that the turn-on signal transmitted by the second scanning line S2 and the turn-on signal transmitted by the third scanning line S3 each are a high level signal, and the turn-off signal transmitted by the second scanning line S2 and the turn-off signal transmitted by the third scanning line S3 each are a low level signal.

Figure 18:
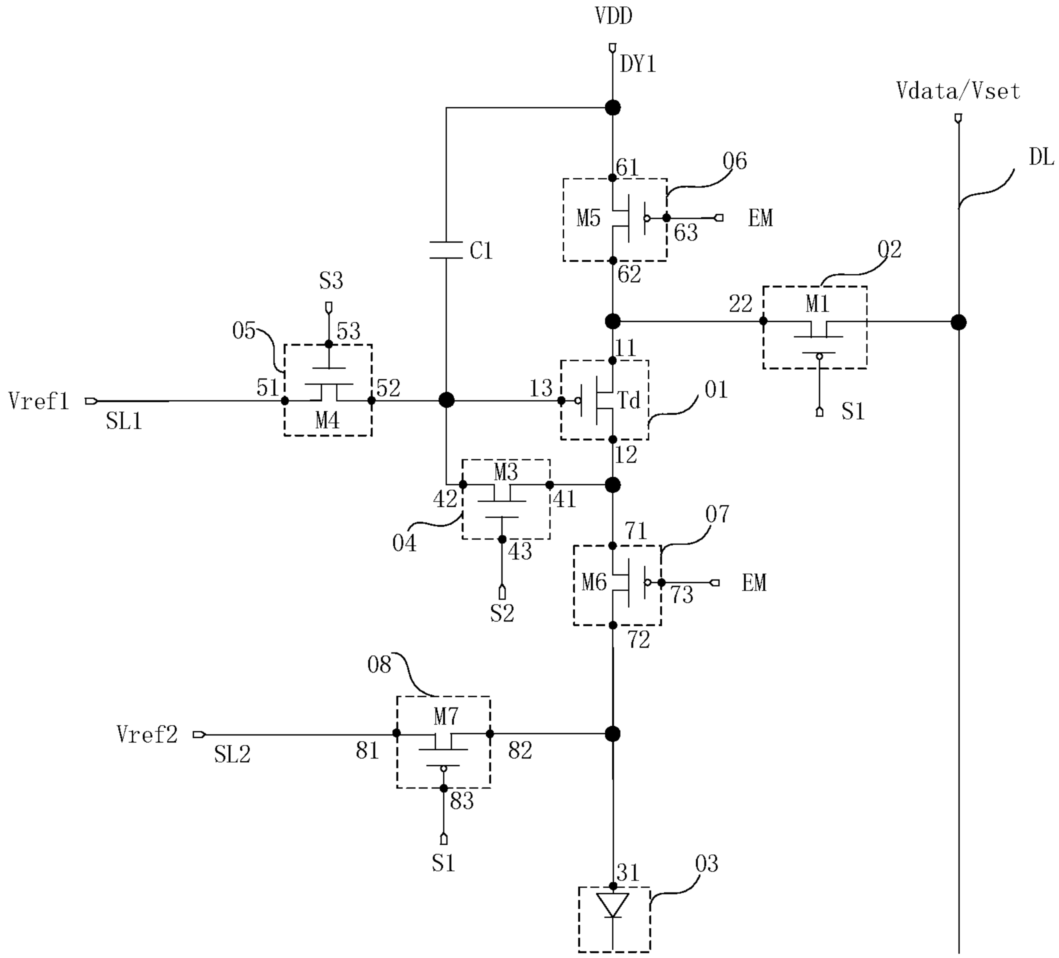
FIG. 18 is a schematic diagram of a pixel circuit of a display panel according to another embodiment of the present disclosure.

FIG. 18 is a schematic diagram of a pixel circuit of a display panel according to another embodiment of the present disclosure.

The pixel circuit 001 shown in FIG. 18 differs from the pixel circuit 001 shown in FIG. 15 in that the third transistor M3 and the fourth transistor M4 are N-type transistors each including a metal oxide active layer, and the gate of the seventh transistor M7 is electrically connected to the first scanning line S1. The signal transmitted by the first scanning line S1 controls the switching state of the first transistor M1 and the switching state of the seventh transistor M7 to be the same. The operating timing sequence of the pixel circuit 001 shown in FIG. 18 can be the same as that shown in FIG. 17.

During the adjusting phase E3 of the second phase T2, the first scanning line S1 transmits a turn-on signal, that is, a low-level signal, and the first transistor M1 and the seventh transistor M7 are turned on; while the adjusting voltage Vset transmitted on the data signal line DL adjusts the bias state of the driving transistor Td, the second reset voltage Vref2 transmitted by the second reset line SL2 can reset the light-emitting element 03.

It can be understood that, during the adjusting phase E3, although the second reset voltage Vref2 can be transmitted to the light-emitting element 03 through the turned-on seventh transistor M7, the adjustment of the bias state of the driving transistor Td is not affected; and the light-emitting element 03 is reset by the second reset voltage Vref2 once before the light-emitting phase of the first phase T1 and the light-emitting phase of the second phase T2, which is beneficial to further reduce the difference between the brightness of the light-emitting element 03 during the first phase T1 and the brightness of the light-emitting element 03 during the second phase T2.

Figure 19:
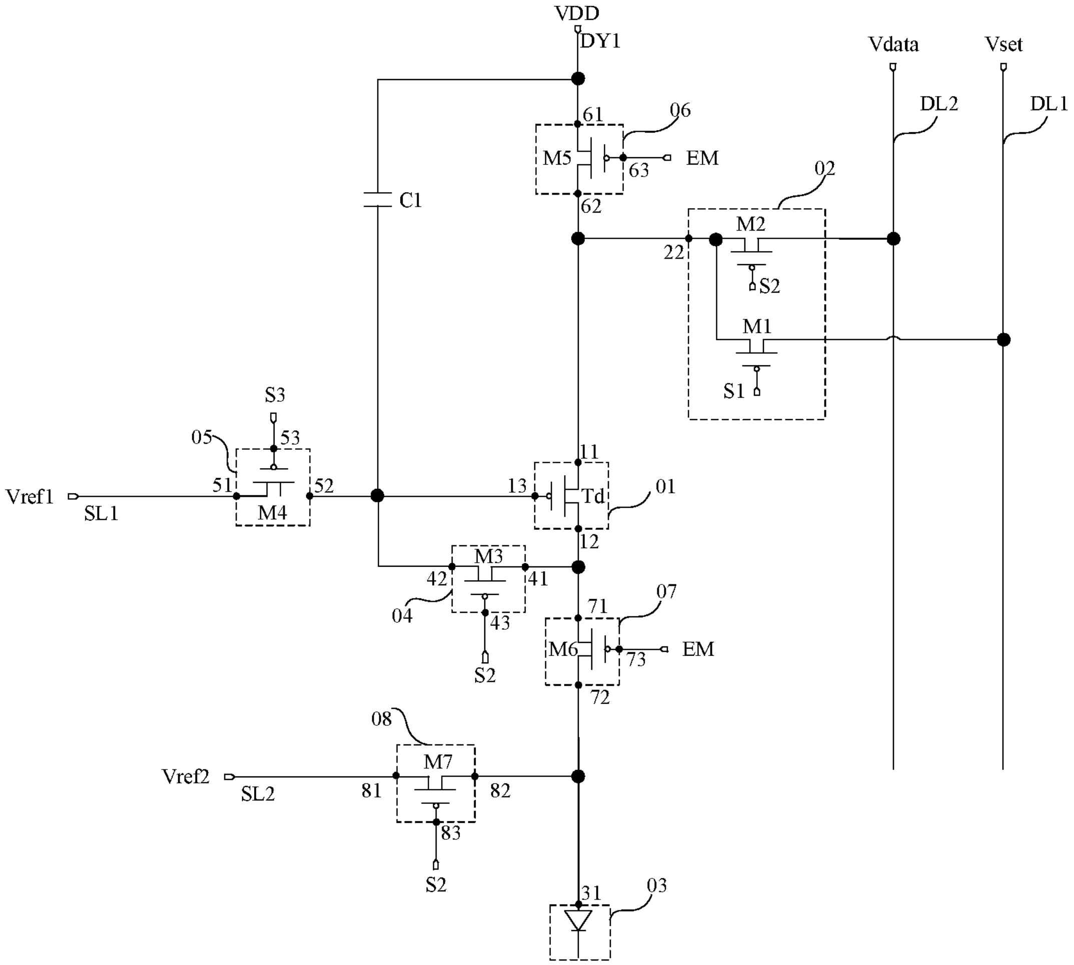
FIG. 19 is a schematic diagram of the pixel circuit shown in FIG. 3 according to an embodiment of the present disclosure.

FIG. 19 is a schematic diagram of the pixel circuit shown in FIG. 3 according to an embodiment of the present disclosure.

The structure of the pixel circuit 001 shown in FIG. 19 differs from structure of the pixel circuit 001 shown in FIG. 15 in that: the data voltage writing module 02 includes a first transistor M1 and a second transistor M2, and a source of the first transistor M1 is electrically connected to the first data signal sub-line DL1 configured to transmit the data voltage Vset; and the source of the second transistor M2 is electrically connected to the second data signal sub-line DL2 configured to transmit the data voltage Vdata, a drain of the second transistor M2 is electrically connected to the source of the driving transistor Td, and a gate of the second transistor M2 is electrically connected to the second scanning line S2. The operating timing sequence of the pixel circuit 001 shown in FIG. 19 can be the same as that shown in FIG. 5. The timing sequence of the pixel circuit 001 shown in FIG. 19 differs from the pixel circuit 001 shown in FIG. 15 in that the first scanning line S1 transmits the turn-on signal only during the adjusting phase E3 of the second phase T2.

Figure 20:
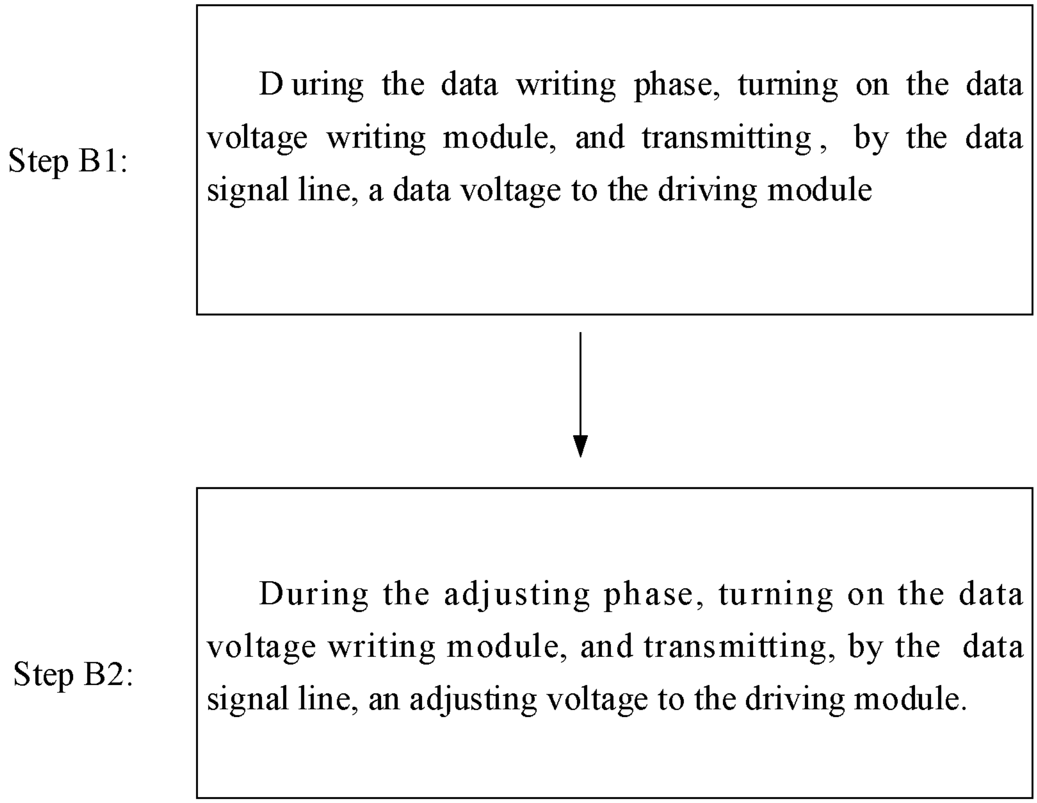
FIG. 20 is a flowchart of a method for driving a display panel according to an embodiment of the present disclosure.

FIG. 20 is a flowchart of a method for driving a display panel according to an embodiment of the present disclosure.

Some embodiments of the present disclosure provide a method for driving a display panel, which is configured to drive the display panel 100 provided by the above embodiments. The display panel 100 includes a pixel circuit 001 and a data signal line DL. The structure of the pixel circuit 001 can refer to the schematic diagrams in FIGS. 3-4, 14-16, 18, and 19. The method for driving the display panel can be understood in conjunction with the operating process of the pixel circuit 001 provided in the above embodiments.

As shown in FIG. 20, the method for driving the display panel includes steps B1 and B2.

At step B1, during the data writing phase E1, the data voltage writing module 02 is turned on, and the data signal line DL transmits the data voltage Vdata to the driving module 01.

At step B2, during the adjusting phase E3, the data voltage writing module 02 is turned on, and the data signal line DL transmits the adjusting voltage Vset to the driving module 01.

The adjusting voltage Vset transmitted by the data signal line DL during the second phase T2 corresponds to the data voltage Vdata transmitted by the data signal line DL during the first phase T1.

In the method provided by the embodiments of the present disclosure, during the adjusting phase E3 of the second phase T2, the data signal line DL transmits the adjusting voltage Vset to the source of the driving transistor Td in the driving module 01 through the turned-on data voltage writing module 02, the bias state of the driving transistor Td can be corrected to reduce the difference between the bias state of the driving transistor Td during the second phase T2 and the bias state of the driving transistor Td during the first phase T1, thereby reducing the difference between the ramping speed of the current received by the light-emitting element 03 during the first phase T1 and the ramping speed of the current received by the light-emitting element 03 during the second phase T2, and thus reducing the difference between the brightness of the display panel 100 during the first phase T1 and the brightness of the display panel 100 during the second phase T2, and improving the display effect of the display panel 100. Since the adjusting voltage Vset transmitted by the data signal line DL during the second phase T2 corresponds to the data voltage Vdata transmitted by the data signal line DL during the first phase T1, the adjusting voltage Vset transmitted by the data signal line DL can be changed according to the changes of the data voltage Vdata transmitted by the data signal line DL, thereby minimizing the difference between the bias states of the driving transistor Td during the second phase T2 and the first phase T1 that belong to the same frame of the image, and improving the display effect of the display panel 100.

In an embodiment of the present disclosure, the data signal line DL includes a first data signal sub-line DL1 and a second data signal sub-line DL2, each of the first data signal sub-line DL1 and the second data signal sub-line DL2 is electrically connected to multiple pixel circuits 001. The data voltage writing module 02 includes a first transistor M1 and a second transistor M2. A source of the first transistor M1 is electrically connected to the first data signal sub-line DL1, and a drain of the first transistor M1 is electrically connected to the input terminal 11 of the driving module 01. A source of the second transistor M2 is electrically connected to the second data signal sub-line DL2, and a drain of the second transistor M2 is electrically connected to the input terminal 11 of the driving module 01.

The method for driving the display panel also includes following steps.

During the data writing phase E1, the first transistor M1 is turned off, the second transistor M2 is turned on, and the second data signal sub-line DL2 transmits the data voltage Vdata to the driving module 01.

During the adjusting phase E3, the first transistor M1 is turned on, the second transistor M2 is turned off, and the first data signal sub-line DL1 transmits the adjusting voltage to the driving module 01.

In some embodiments, the data signal line DL can be a signal line pair including a first data signal sub-line DL1 and a second data signal sub-line DL2, the first data signal sub-line DL1 in the data signal lines DL is configured to transmit the adjusting voltage Vset, and the second data signal sub-line DL2 in the data signal line DL is configured to transmit the data voltage Vdata.

In other embodiments of the present disclosure, the data voltage writing module 02 includes a first transistor M1. A source of the first transistor M1 is electrically connected to the data signal line DL, and a drain of the first transistor M1 is electrically connected to the input terminal 11 of the driving module 01.

The method for driving the display panel can include following steps.

During the data writing phase E1, the first transistor M1 is turned on, and the data signal line DL transmits the data voltage Vdata to the driving module 01.

During the adjusting phase E3, the first transistor M1 is turned on, and the data signal line DL transmits the adjusting voltage Vset to the driving module 01.

In some embodiments, the data signal line DL can be only one signal line, and is configured to transmit both the data voltage Vdata and the adjusting voltage Vset.

In some embodiments of the present disclosure, transmitting the adjusting voltage Vset by the data signal line DL to the driving module 01, includes: transmitting at least two different adjusting voltages Vset by the data signal line DL.

The embodiments of the present disclosure can ensure that in a same frame of the frame, when the data signal line DL transmits different data voltages Vdata to multiple pixel circuits 001 electrically connected to the data signal line DL during the first phase T1, the correction accuracy of bias state of the driving transistor Td in multiple pixel circuits 001 is improved. Therefore, the difference between the bias state of the driving transistors Td in multiple pixel circuits 001 during the second phase T2 and the bias state of the driving transistors Td in multiple pixel circuits 001 during the first phase T1 can be reduced, and the display effect of the display panel 100 can be improved.

In some embodiments, transmitting, by the data signal line DL, at least two different adjusting voltages Vset, includes:

Transmitting, by the data signal line DL, the first adjusting voltage Vset1 to i pixel circuits 001 arranged consecutively; and Transmitting, by the data signal line DL, the second adjusting voltage Vset2 to j pixel circuits 001 arranged consecutively.

The first adjusting voltage Vset1 and the second adjusting voltage Vset2 are adjusting voltages Vset with different voltage values, and 1≤i, 1≤j.

Figure 21:
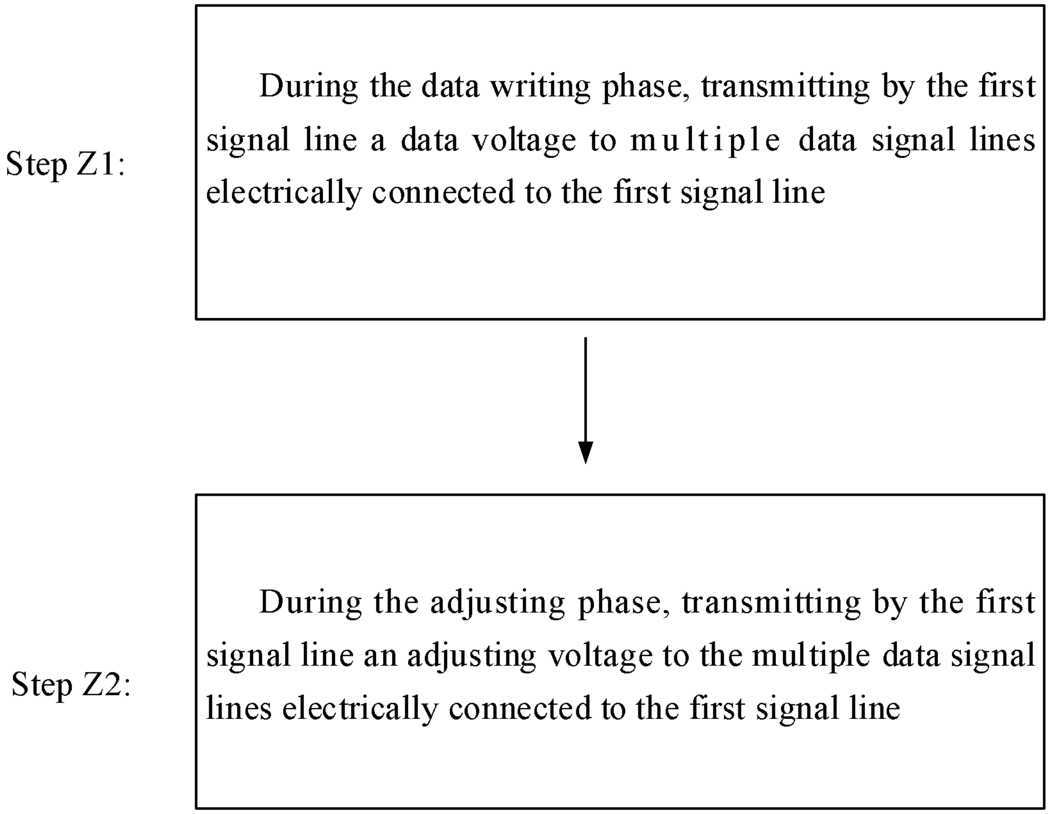
FIG. 21 is a flowchart of a method for driving a display panel according to another embodiment of the present disclosure.

FIG. 21 is a flowchart of a method for driving a display panel according to another embodiment of the present disclosure.

In some embodiments of the present disclosure, the display panel 100 includes multiple first signal lines XL electrically connected to M data signal lines DL, where M≥1.

As shown in FIG. 21, the method for driving the display panel can include steps Z1 and Z2.

At step Z1, during the data writing phase E1, the first signal line XL transmits the data voltage Vdata to the data signal line DL electrically connected to the first signal line XL.

At step Z2, during the adjusting phase E3, the first signal line XL transmits the adjusting voltage Vset to the data signal line DL electrically connected to the first signal line XL.

When one frame of an image is displayed, the adjusting voltage Vset transmitted by the first signal line XL corresponds to an average value of at least one data voltage of the data voltages Vdata that are sequentially transmitted to the M data signal lines DL.

In some embodiments of the present disclosure, when one frame of an image is displayed, the first signal line XL can transmit the adjusting voltages Vset corresponding, in a one-to-one correspondence, to the data voltages Vdata transmitted by the first signal line XL, or transmit the adjusting voltage Vset corresponding to an average value of the data voltages Vdata transmitted by the first signal line XL.

In some embodiments of the present disclosure, at step Z2, transmitting, by the first signal line XL, the adjusting voltage Vset to the data signal line DL electrically connected to the first signal line XL, including: when one frame of an image is displayed, transmitting, by the first signal line XL, the adjusting voltage Vset corresponding to an average value of all data voltages Vdata transmitted to the M data signal lines DL.

In the embodiments of the present disclosure, during one frame of an image, the first signal line XL transmits only one adjusting voltage Vset, which is beneficial to reduce the power consumption of the display panel 100.

Figure 22:
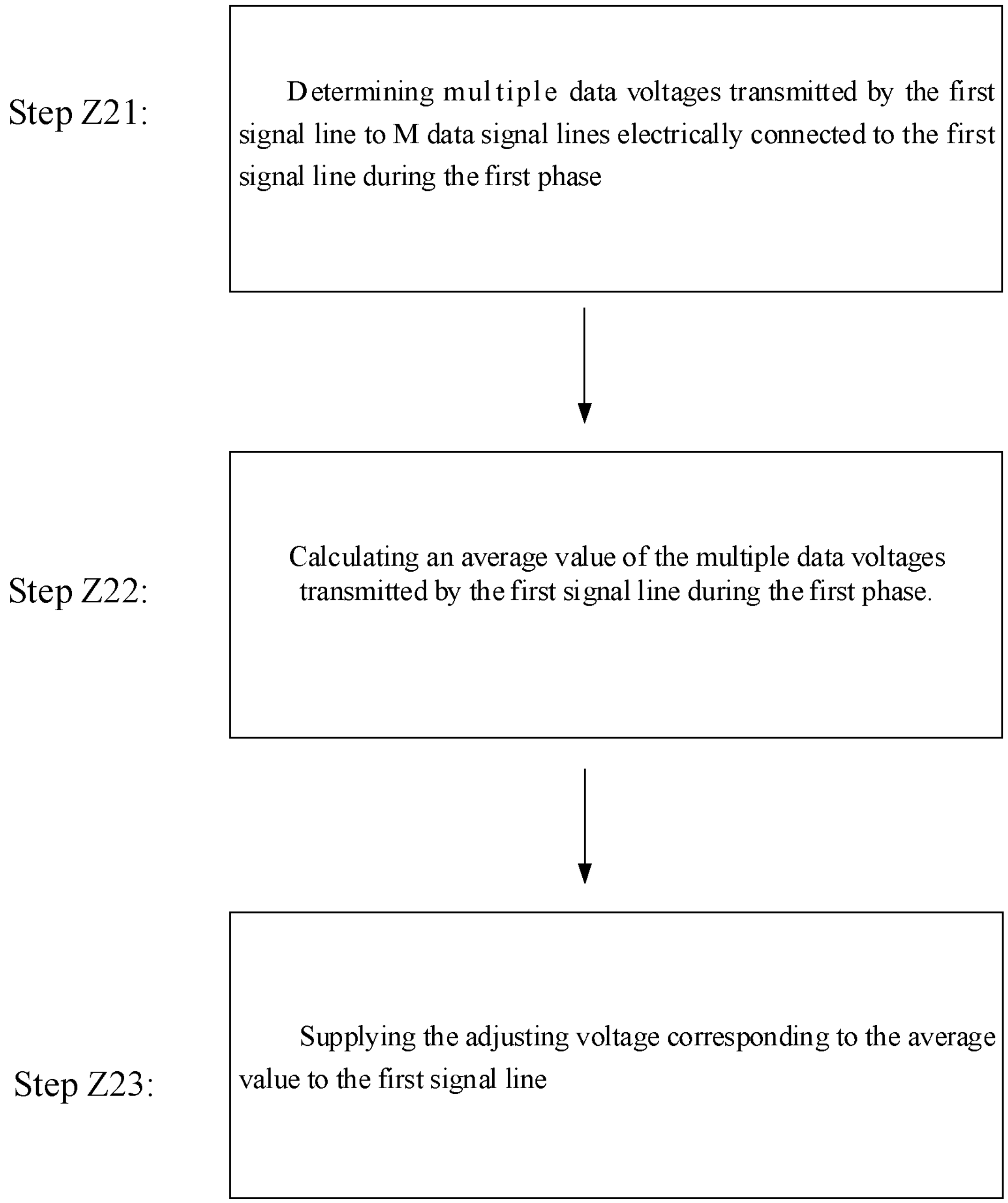
FIG. 22 is an operating flow chart of step Z2 shown in FIG. 21 according to an embodiment of the present disclosure.

FIG. 22 is an operating flow chart of step Z2 shown in FIG. 21 according to an embodiment of the present disclosure.

In some embodiments of the present disclosure, as shown in FIG. 22, at step Z2, transmitting, by the first signal line XL, the adjusting voltage Vset to the data signal line DL electrically connected to the first signal line XL, including step Z21, step Z22, and step Z23.

At step Z21, the data voltage Vdata transmitted by the first signal line XL to the M data signal lines DL electrically connected to the first signal line XL during the first phase T1 is determined.

At step Z22, the average value of multiple data voltages Vdata transmitted by the first signal line XL during the first phase T1 is calculated.

At step Z23, the adjusting voltage Vset corresponding to the average value is provided to the first signal line XL.

In the present disclosure, the adjusting voltage Vset corresponding to the data voltage Vdata transmitted by the first signal line XL can be determined, so as to provide the adjusting voltage Vset to the first signal line XL, and to provide the adjusting voltage Vset to the pixel circuit 001 connected to the first signal line XL, so that it is beneficial to improve the accuracy of the bias state of the driving transistor Td in the pixel circuit 001, and to improve the display effect of the display panel 100.

Figure 23:
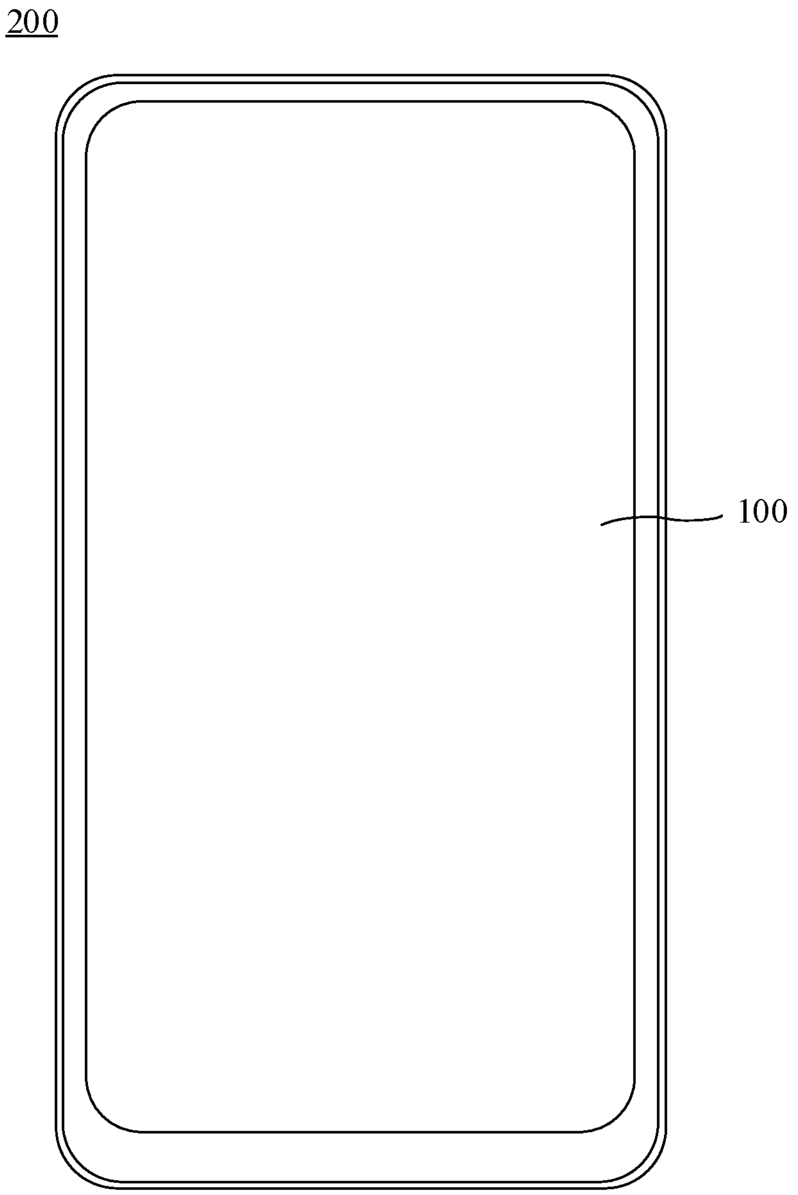
FIG. 23 is a schematic diagram of a display apparatus according to an embodiment of the present disclosure.

FIG. 23 is a schematic diagram of a display apparatus according to an embodiment of the present disclosure.

Some embodiments of the present disclosure provide a display apparatus 200. As shown in FIG. 23, the display apparatus 200 includes the display panel 100 provided in the above embodiments. The display apparatus 200 provided by the embodiments of the present disclosure can be a mobile phone, a computer, or a TV.

In the display apparatus 200, during the adjusting phase E3 of the second phase T2, the data signal line DL transmits the adjusting voltage Vset to the source of the driving transistor Td in the driving module 01 through the turned-on data voltage writing module 02, so that the bias state of the driving transistor Td can be corrected, thereby reducing the difference between the bias state of the driving transistor Td during the second phase T2 and the bias state of the driving transistor Td during the first phase T1. In this way, the difference between the ramping speed of the current received by the light-emitting element 03 during the first phase T1 and the ramping speed of the current received by the light-emitting element 03 during the second phase T2 is reduced, thereby reducing the difference between the brightness of the display panel 100 during the first phase T1 and the brightness of the display panel 100 during the second phase T2, and thus improving the display effect of the display panel 100. Since the adjusting voltage Vset transmitted by the data signal line DL during the second phase T2 corresponds to the data voltage Vdata transmitted by the data signal line DL during the first phase T1, the adjusting voltage Vset transmitted by the data signal line DL can be changed according to the change of the data voltage Vdata transmitted by the data signal line DL, thereby minimizing the difference of the bias states of the driving transistor Td during the second phase T2 and the first phase T1 that belong to a same frame of the image, and thus improving the display effect of the display panel 100.

The above are merely some embodiments of the present disclosure, which, as mentioned above, are not configured to limit the present disclosure. Whatever within the principles of the present disclosure, including any modification, equivalent substitution, improvement, etc., shall fall into the protection scope of the present disclosure.

What is claimed is:

1. A display panel, comprising:

a plurality of data signal lines arranged along a first direction and electrically connected to a plurality of pixel circuits, wherein each of the plurality of pixel circuits comprises:
a driving module configured to generate a light-emitting driving current,
a data voltage writing module configured to transmit a signal transmitted by one of the plurality of data signal lines to an input terminal of the driving module; and
a threshold voltage capturing module,
wherein when the display panel displays one frame of at least one frame of an image, the display panel comprises a first phase and a second phase performed after the first phase, wherein the first phase comprises a data writing phase and a first light-emitting phase performed after the data writing phase, and the second phase comprises at least one adjusting phase and a second light-emitting phase performed after the at least one adjusting phase;
during the data writing phase, the data voltage writing module is turned on, and the one of the plurality of data signal lines is configured to transmit a data voltage to the driving module;
during each of the at least one adjusting phase, the data voltage writing module is turned on, and the one of the plurality of data signal lines is configured to transmit an adjusting voltage to the driving module; and when the display panel displays one frame of the at least one frame of the image, the adjusting voltage transmitted by the one of the plurality of data signal lines during the second phase corresponds to the data voltage transmitted by the one of the plurality of data signal lines during the first phase;
the threshold voltage capturing module is turned off during the at least one adjusting phase; and
the driving module comprises a driving transistor, the adjusting voltage is configured to reduce a difference between a bias state of the driving transistor during the second phase and a bias state of the driving transistor during the first phase.

2. The display panel according to claim 1, wherein each of at least one of the plurality of data signal lines comprises a first data signal sub-line and a second data signal sub-line, the first data signal sub-line and the second data signal sub-line each are electrically connected to at least two of the plurality of pixel circuits;
the data voltage writing module comprises a first transistor and a second transistor, wherein the first transistor comprises a source electrically connected to the first data signal sub-line, and a drain electrically connected to the input terminal of the driving module; and the second transistor comprises a source electrically connected to the second data signal sub-line, and a drain electrically connected to the input terminal of the driving module;
during the data writing phase, the first transistor is turned off, the second transistor is turned on, and the second data signal sub-line of the one of the plurality of data signal lines is configured to transmit the data voltage; and
during each of the at least one adjusting phase, the first transistor is turned on, the second transistor is turned off, and the first data signal sub-line of the one of the plurality of data signal lines is configured to transmit the adjusting voltage.

3. The display panel according to claim 1, wherein the data voltage writing module comprises a first transistor, wherein the first transistor comprises a source electrically connected to the one of the plurality of data signal lines, and a drain electrically connected to the input terminal of the driving module;
during the data writing phase, the first transistor is turned on, and the one of the plurality of data signal lines is configured to transmit the data voltage; and
during each of the at least one adjusting phase, the first transistor is turned on, and the one of the plurality of data signal lines is configured to transmit the adjusting voltage.

4. The display panel according to claim 1, wherein the at least one adjusting phase comprises a plurality of adjusting phases, and the adjusting voltages transmitted by the one of the plurality of data signal lines during the plurality of adjusting phases comprise at least two different adjusting voltages.

5. The display panel according to claim 2, wherein among at least two pixel circuits of the plurality of pixel circuits that are electrically connected to one of the plurality of data signal lines, the adjusting voltages received by i pixel circuits of the at least two pixel circuits that are arranged consecutively are a first adjusting voltage, the adjusting voltages received by j pixel circuits of the at least two pixel circuits that are arranged consecutively are a second adjusting voltage, and the first adjusting voltage and the second adjusting voltage have different voltage values, where $1\leq i$, $1\leq j$.

6. The display panel according to claim 1, further comprising:
a plurality of first signal lines, wherein each of the plurality of first signal lines is electrically connected to M data signal lines of the plurality of data signal lines, and is configured to transmit the data voltage and the adjusting voltage to each of the M data signal lines electrically connected to the first signal line, where $M\geq 1$; and
wherein when the display panel displays the one frame of the at least one frame of the image, the adjusting voltage transmitted by one first signal line of the plurality of first signal lines corresponds to an average value of at least one data voltage of the data voltages that are sequentially transmitted to the M data signal lines by the one first signal line.

7. The display panel according to claim 6, wherein when the display panel displays the one frame of the at least one frame of the image, the one first signal line is configured to transmit the adjusting voltages to the M data signal lines, wherein the adjusting voltages comprises at least two different adjusting voltages.

8. The display panel according to claim 7, wherein the at least two different adjusting voltages comprise a first adjusting voltage and a second adjusting voltage that have different voltage values;
among at least two rows of pixel circuits of the plurality of pixel circuits that are electrically connected to the M data signal lines, i rows of pixel circuits of the at least two rows of pixel circuits are arranged consecutively and configured to receive the first adjusting voltage, and j rows of pixel circuits of the at least two different adjusting voltages are arranged consecutively and configured to receive the second adjusting voltage, where $1\leq i$, and $1\leq j$.

9. The display panel according to claim 6, wherein when the display panel displays the one frame of the at least one frame of the image, the adjusting voltage transmitted by the one first signal line corresponds to an average value of the data voltages that are respectively transmitted by the one first signal line to the M data signal lines.

10. The display panel according to claim 6, wherein the at least one frame of the image comprises a first frame of the image and a second frame of the image; and when an average value of at least one data voltage of the data voltages that are transmitted by one of the plurality of first signal lines to the M data signal lines during the first phase of the first frame of the image is different from an average value of at least one data voltage of the data voltages that are transmitted by the one of the plurality of first signal lines during the first phase of the second frame of the image, the adjusting voltage transmitted by the one of the plurality of first signal lines during the second phase of the first frame of the image is different from the adjusting voltage transmitted by the one of the plurality of first signal lines during the second phase of the second frame of the image.

11. The display panel according to claim 6, wherein when an average value of at least one data voltage of the data voltages that are transmitted by a first one of the plurality of first signal lines to the M data signal lines during the first phase is different from an average value of at least one data voltage of the data voltages that are transmitted by a second one of the plurality of first signal lines during the first phase, and wherein the adjusting voltage transmitted by the first one of the plurality of first signal lines during the second phase is different from the adjusting voltage transmitted by the second one of the plurality of first signal lines during the second phase.

12. The display panel according to claim 6, further comprising:

demultiplexers, wherein each of the demultiplexers comprises an input terminal electrically connected to one of the plurality of first signal lines, and a plurality of output terminals electrically connected to at least two of the plurality of data signal lines in one-to-one correspondence; and during the at least one adjusting phase, the plurality of output terminals output the adjusting voltage simultaneously.

13. The display panel according to claim 3, wherein the driving module comprises a driving transistor, wherein the driving transistor comprises a source electrically connected to an output terminal of the data voltage writing module;

the threshold voltage capturing module comprises an input terminal electrically connected to a drain of the driving transistor, and an output terminal electrically connected to a gate of the driving transistor; and the threshold voltage capturing module is turned on during the data writing phase.

14. The display panel according to claim 13, wherein the drain of the first transistor is electrically connected to the source of the driving transistor, and a gate of the first transistor is electrically connected to a first scanning line; and the threshold voltage capturing module comprises a third transistor, wherein the third transistor comprises a source electrically connected to the drain of the driving transistor, a drain electrically connected to the gate of the driving transistor, and a gate electrically connected to a second scanning line.

15. The display panel according to claim 14, wherein the third transistor comprises a metal oxide active layer.

16. The display panel according to claim 14, wherein each of the plurality of pixel circuits further comprises a first reset module, wherein the first reset module comprises an input terminal electrically connected to a first reset line, and an output terminal electrically connected to the gate of the driving transistor;

the first phase further comprises a reset phase performed before the data writing phase;

during the reset phase, the first reset module is turned on, and the first reset line transmits a first reset voltage; and the first reset module is turned off during the at least one adjusting phase.

17. The display panel according to claim 16, wherein the first reset module comprises a fourth transistor, wherein the fourth transistor comprises a source electrically connected to the first reset line, a drain electrically connected to the gate of the driving transistor, and a gate electrically connected to a third scanning line.

18. The display panel according to claim 17, wherein the fourth transistor comprises a metal oxide active layer.

19. The display panel according to claim 16, wherein each of the plurality of pixel circuits further comprises a power voltage writing module and a light-emitting control module, wherein the power voltage writing module is connected between a power voltage signal line and the source of the driving transistor, and the light-emitting control module is connected between the drain of the driving transistor and a light-emitting element; and a control terminal of the power voltage writing module and a control terminal of the light-emitting control module are both electrically connected to one of at least one light-emitting control signal line, and a signal transmitted by one of the at least one light-emitting control signal line controls the power voltage writing module and the light-emitting control module to have a same turn-on/off state.

20. A method for driving a display panel, wherein the display panel comprises a plurality of data signal lines arranged along a first direction and electrically connected to a plurality of pixel circuits, wherein each of the plurality of pixel circuits comprises a driving module comprising a driving transistor and configured to generate a light-emitting driving current, a data voltage writing module configured to transmit a signal transmitted by one of the plurality of data signal lines to an input terminal of the driving module, and a threshold voltage capturing module; wherein the display panel displays one frame of at least one frame of an image, the display panel comprises a first phase and a second phase performed after the first phase, wherein the first phase comprises a data writing phase and a first light-emitting phase performed after the data writing phase, and the second phase comprises at least one adjusting phase and a second light-emitting phase performed after the at least one adjusting phase, wherein the threshold voltage capturing module is turned off during the at least one adjusting phase; and wherein the method comprises:

during the data writing phase, turning on the data voltage writing module, and transmitting, by the one of the plurality of data signal lines, a data voltage to the driving module; and during each of the at least one adjusting phase, turning on the data voltage writing module, and transmitting, by the one of the plurality of data signal lines, an adjusting voltage to the driving module, wherein the adjusting voltage transmitted by the one of the plurality of data signal lines during the second phase corresponds to the data voltage transmitted by the one of the plurality of data signal lines during the first phase, and the adjusting voltage is configured to reduce a difference between a bias state of the driving transistor during the second phase and a bias state of the driving transistor during the first phase.

21. The method according to claim 20, wherein each of at least one of the plurality of data signal lines comprises a first data signal sub-line and a second data signal sub-line, the first data signal sub-line and the second data signal sub-line each are electrically connected to at least two of the plurality of pixel circuits; the data voltage writing module comprises a first transistor and a second transistor, wherein the first transistor comprises a source electrically connected to the first data signal sub-line, and a drain electrically connected to the input terminal of the driving module; and the second transistor comprises a source electrically connected to the second data signal sub-line, and a drain electrically connected to the input terminal of the driving module; and wherein the method further comprising:

during the data writing phase, turning off the first transistor, turning on the second transistor, and transmitting, by the second data signal sub-line, the data voltage to the driving module; and during each of the at least one adjusting phase, turning on the first transistor, turning off the second transistor, and transmitting, by the first data signal sub-line, the adjusting voltage to the driving module.

22. The method according to claim 20, wherein the data voltage writing module comprises a first transistor, wherein the first transistor comprises a source electrically connected to the one of the plurality of data signal lines, and a drain electrically connected to the input terminal of the driving module; and wherein the method further comprising:

during the data writing phase, turning on the first transistor, and transmitting, by the one of the plurality of data signal lines, the data voltage to the driving module; and during each of the at least one adjusting phase, turning on the first transistor, and transmitting, by the one of the plurality of data signal lines, the adjusting voltage to the driving module.

23. The method according to claim 20, wherein the at least one adjusting phase comprises a plurality of adjusting phases; and wherein said transmitting, by the one of the plurality of data signal lines, the adjusting voltage to the driving module, comprises:

transmitting, by the one of the plurality of data signal lines, at least two different adjusting voltages of the adjusting voltages that are transmitted by the one of the plurality of data signal lines during the plurality of adjusting phases.

24. The method according to claim 23, wherein said transmitting, by the one of the plurality of data signal lines, the at least two adjusting voltages, comprises:

transmitting, by the one of the plurality of data signal lines, a first adjusting voltage of the at least two adjusting voltages to i pixel circuits of the plurality of pixel circuits that are arranged consecutively; and transmitting by the one of the plurality of data signal lines, a second adjusting voltage of the at least two adjusting voltages to j pixel circuits of the plurality of pixel circuits that are arranged consecutively, wherein the first adjusting voltage and the second adjusting voltage have different voltage values, where $1 \leq i$, and $1 \leq j$.

25. The method according to claim 20, wherein the display panel further comprises a plurality of first signal lines electrically connected to M data signal lines of the plurality of data signal lines, where $M \geq 1$;

wherein the method further comprises:

during the data writing phase, transmitting, by one of the plurality of first signal lines, the data voltage to the M data signal lines electrically connected to the one of the plurality of first signal lines, and during each of the at least one adjusting phase, transmitting, by the one of the plurality of first signal lines, the adjusting voltage to the M data signal lines electrically connected to the one of the plurality of first signal lines; and wherein when the display panel displays one frame of the at least one frame of the image, the adjusting voltage transmitted by one first signal line of the plurality of first signal lines corresponds to an average value of at least one data voltage of the data voltages that are sequentially transmitted to the M data signal lines by the one first signal line.

26. The method according to claim 25, wherein said transmitting, by the one of the plurality of first signal lines, the adjusting voltage to the M data signal lines electrically connected to the one of the plurality of first signal lines, comprises:

when the display panel displays the one frame of the at least one frame of the image, setting the adjusting voltage transmitted by the one of the plurality of first signal lines to correspond to an average value of the data voltages that are respectively transmitted by the one of the plurality of first signal lines to the M data signal lines.

27. The method according to claim 25, wherein said transmitting, by the one of the plurality of first signal lines, the adjusting voltage to the M data signal lines electrically connected to the one of the plurality of first signal lines, comprises:

determining the data voltages transmitted by the one of the plurality of first signal lines to the M data signal lines electrically connected to the one of the plurality of first signal lines during the first phase;

calculating an average value of at least two of the data voltages transmitted by the one of the plurality of first signal lines to the M data signal lines electrically connected to the one of the plurality of first signal lines during the first phase; and supplying the adjusting voltage corresponding to the average value to the one of the plurality of first signal lines.

28. A display apparatus, comprising a display panel, wherein the display panel comprises:

a plurality of data signal lines arranged along a first direction and electrically connected to a plurality of pixel circuits, wherein each of the plurality of pixel circuits comprises:

a driving module configured to generate a light-emitting driving current, a data voltage writing module configured to transmit a signal transmitted by one of the plurality of data signal lines to an input terminal of the driving module; and a threshold voltage capturing module, wherein when the display panel displays one frame of at least one frame of an image, the display panel comprises a first phase and a second phase performed after the first phase, wherein the first phase comprises a data writing phase and a first light-emitting phase performed after the data writing phase, and the second phase comprises at least one adjusting phase and a second light-emitting phase performed after the at least one adjusting phase;

during the data writing phase, the data voltage writing module is turned on, and the one of the plurality of data signal lines is configured to transmit a data voltage to the driving module; and during each of the at least one adjusting phase, the data voltage writing module is turned on, and the one of the plurality of data signal lines is configured to transmit an adjusting voltage to the driving module; and when the display panel displays one frame of the at least one frame of the image, the adjusting voltage transmitted by the one of the plurality of data signal lines during the second phase corresponds to the data voltage transmitted by the one of the plurality of data signal lines during the first phase;

the threshold voltage capturing module is turned off during the at least one adjusting phase; and the driving module comprises a driving transistor, the adjusting voltage is configured to reduce a difference between a bias state of the driving transistor during the second phase and a bias state of the driving transistor during the first phase.

* * * * *